US012776144B2

(12) United States Patent
Khan et al.

(10) Patent No.: US 12,776,144 B2
(45) Date of Patent: Oct. 27, 2026

(54) METHOD AND SYSTEM FOR CUSTOMIZED DETECTION TRACKING AND COUNTING OF PEOPLE

(71) Applicant: ELM Company, Riyadh (SA)

(72) Inventors: Arshad Ali Khan, Riyadh (SA); Riad Souissi, Riyadh (SA)

(73) Assignee: ELM Company, Riyadh (SA)

( * ) Notice: Subject to any disclaimer, the term of this patent is extended or adjusted under 35 U.S.C. 154(b) by 319 days.

(21) Appl. No.: 18/628,526

(22) Filed: Apr. 5, 2024

(65) Prior Publication Data

US 2024/0338946 A1 Oct. 10, 2024

Related U.S. Application Data

(60) Provisional application No. 63/494,571, filed on Apr. 6, 2023.

(51) Int. Cl.
*G06V 20/50* (2022.01)
*G06V 10/26* (2022.01)
(Continued)

(52) U.S. Cl.
CPC .............. *G06V 20/53* (2022.01); *G06V 10/26* (2022.01); *G06V 10/30* (2022.01); *G06V 10/774* (2022.01); *G06V 10/776* (2022.01); *G06V 10/82* (2022.01); *G06V 20/41* (2022.01); *G06V 20/46* (2022.01); *G06V 40/10* (2022.01)

(58) Field of Classification Search
CPC ........ G06V 20/53; G06V 10/26; G06V 10/30; G06V 10/774; G06V 10/776; G06V 10/82; G06V 20/41; G06V 20/46; G06V 40/10; G06V 10/764; G06V 20/52
See application file for complete search history.

(56) References Cited

U.S. PATENT DOCUMENTS

2020/0241962 A1* 7/2020 Dain .................. G06F 11/1435
2020/0387716 A1* 12/2020 Nadler .................. G06V 40/16
(Continued)

OTHER PUBLICATIONS

Carrillo-Medina, ("person re-identification using soft-biometric features: body silhouette and clothing texture in a multi-camera video surveillance environment", IEEE 2022, pp. 36-43) (Year: 2022).*

*Primary Examiner* — Amara Abdi
(74) *Attorney, Agent, or Firm* — NKL Law; Allen Xue

(57) ABSTRACT

Provided are computer-implemented technologies for crowd analysis. The technologies process input video footages of a crowd to detect people from the input, uniquely identify the detected people, track and count them across all the frames throughout the footages, classify them based on features of the identified people such as detected gender of the identified people. The technologies use customarily trained AI models that are specifically trained and retrained for detecting people in the local population that typically wear Arab style clothing. The learned models, through the training, quality controlling and retraining, attain the prediction capability for accurately detecting, identifying and classifying people from crowd scenes. The learned model, then, is applied to crowd analysis to provide detection and classification report of the crowd, which can be used for deeper analysis to fill various business/institutional needs.

18 Claims, 27 Drawing Sheets

A schematical flowchart of components involved in people counting analytics system

(51) Int. Cl.

| | |
|---|---|
| ***G06V 10/30*** | (2022.01) |
| ***G06V 10/774*** | (2022.01) |
| ***G06V 10/776*** | (2022.01) |
| ***G06V 10/82*** | (2022.01) |
| ***G06V 20/40*** | (2022.01) |
| ***G06V 20/52*** | (2022.01) |
| ***G06V 40/10*** | (2022.01) |

(56) References Cited

U.S. PATENT DOCUMENTS

| | | | | |
|---|---|---|---|---|
| 2021/0027048 | A1* | 1/2021 | Li | G06F 18/2431 |
| 2021/0158399 | A1* | 5/2021 | Yang | G06F 3/013 |
| 2022/0036093 | A1* | 2/2022 | Kimura | G06T 7/11 |
| 2022/0138621 | A1* | 5/2022 | Patil | G06N 20/00 706/11 |
| 2022/0185625 | A1* | 6/2022 | One | B66B 1/28 |
| 2022/0366279 | A1* | 11/2022 | Cai | G06N 5/04 |
| 2022/0374274 | A1* | 11/2022 | Chen | G06F 9/5027 |
| 2023/0075425 | A1* | 3/2023 | Muehlenstaedt | G06N 3/084 |
| 2023/0229578 | A1* | 7/2023 | Nakryyko | G06F 11/0775 714/38.14 |
| 2023/0351761 | A1* | 11/2023 | Hoang | G06T 7/70 |
| 2025/0173747 | A1* | 5/2025 | Song | G06V 40/10 |

* cited by examiner

A general computational environment

A schematical overview of a people (crowd) analytics system

A schematical flowchart of components involved in people counting analytics system

400

FIG. 4 A schematic diagram of model training and retraining

A schematic flow of people detection, identification and tracking

A schematic flow of people detection (gender-based), identification and tracking A schematical view of a system architecture, for one embodiment, in which detection of persons via a ReID system for discovery and tracking

A schematical view of an integrated system architecture showing iterative custom data training and AI algorithms optimization

900

A schematical overview of system architecture that extends its capacity beyond gender-based predictor, and gender-based classifier

An image reel showing similar and different persons in a dataset, to be annotated and labelled by trained human (or machine-enabled automatic) annotators and labelers An example of front and back frames (two consecutive frames) in a video sequence showing movement and changing positions, appearance with local/global features A single frame showing two persons having different portions of their bodies visible

A number of sample images of males and females, which have been used to train (re-train) the ReID model for mitigating the repeat counting error in people counting

An image contains non-person objects is going to be deleted in a dataset sample distillation process A M (male) folder contains a cropped image of multiple males in one image A F (female) folder contains a cropped image of multiple females in one image All of the cropped images that contain a mix of the males and females from either the M or the F folder A schematic crowd-counting pipeline Four screenshots form an embodiment tried out at different location to tune in performance and pre-deployment Alpha-Beta testing FIG. 20 The Train/Classification loss data for full and visible body detection of people wearing Arab dresses

The Precision and Recall data for full body and visible body

A sample from dataset and the application of adaptive neural network

A performance visualization of the training and validation loss and accuracy on test and train data samples

A Mean Average Precision (mAP) calculated over the entire detected class used for finetuning the YOLOV5Crowdhuman detector A recall curve showing model performance on the overall detection in all scenarios A precision curve showing model performance in terms of accurate detection in all scenarios A demonstration of a Visible and Full body bbox detection A model performance in terms of detecting full and visible bboxes A few screenshots from the deployed system A few more screenshots from the deployed system

FIG. 29
16
13
0
Entry
Exit
Total
Entry
Exit
Total
Entry
Exit
Hourly Occurence Count Pie Chart
Hourly Count Heatmap

METHOD AND SYSTEM FOR CUSTOMIZED DETECTION TRACKING AND COUNTING OF PEOPLE

RELATED APPLICATIONS

This application claims the benefit of priority under 35 U.S.C. § 119 to U.S. Provisional Application No. 63/494,571, filed on Apr. 6, 2023, the entire contents of which are incorporated herein by reference.

BACKGROUND

1. Field of Technology

The present invention relates to the field of technology-enabled objects detection, identification, tracking, and counting. Specifically, the present method and/or system relates to technologically identifying, classifying, counting, and tracking individual people among a human crowd from one or more video streams of a human crowd.

2. Description of Related Art

Counting, tracking and analyzing people in events, points of interest play an important role in analyzing people and their movements. People counting and occupancy monitoring, via deep learning algorithms, in indoor and outdoor areas of interest garnishes interests from business and/or institutional organizations. It is a cost-effective method to detect and track individual people in real-time video as well as pre-recorded videos from CCTV or surveillance cameras in order to fulfill various business/institutional needs. They include but not limited to people inflow monitoring inside a particular building premises, sport venues monitoring, shopping malls analytics, crowd management, stampede prediction etc. The solution is implemented by using AI algorithms (AI-enabled computer vision algorithms) that can automatically detect people in the video footages; track them until they are inside or outside of a particular area or point of interest; and keep a tally of their number, present at a given time in a pre-recorded video or the stream coming from a LIVE RTSP (Real time streaming protocol) photographing device (such as camera). Such information systems can be very useful for businesses and organizations to attain deep knowledge and/or implications from people traffic, estimate the occupancy levels of people and ensure compliance with regulations like social distancing, occupancy limits and healthy living standards compliance etc.

Object detection, tracking and classification have been a challenging problem in AI computer vision applications. Person detection is one such area where person identification, tracking and counting have been studied using deep learning approaches. The number of methodologies adopted to extract person objects from images and videos broadly include two categories: one stage detection and two stage detection and tracking. While one stage approach offers speeds and efficiency, its accuracy and precision are affected. The two-stage approach offers accuracy and precision at the cost of speed. A balanced approach, therefore, is needed to not only accurately position the bounding boxes around detected persons, label the boxes with relevant information about the detected persons, but also accurately return detected persons' relative position from one frame to another in one or more video streams, meaning an effective tracking. In other words, effective tracking depends on, among other things, accurate and efficient detection.

One approach for achieving accurate and efficient detection is using an artificial intelligence (AI) model that are trained to detect people from video footages. However, the effectiveness of such an AI model depends on the model's architecture, data used for training the model, and training methods. There are rooms for improvement in the training of an AI model for detecting, especially real-timely detecting, peoples from one or more video footages of people traffic. The disclosure of this application proposes and implements a hybrid people detector and counter which incorporates the existing Yolo-based end-to-end deep learning models to detect, track and count people in different scenarios. Note: Yolo (You Only Look Once) is an open-sourced real-time object detection algorithm by spatially separating bounding boxes and associating probabilities to each of the detected images using a single convolutional neural network (CNN). It has high speed, high detection accuracy, and better generalization (in terms of application in new fields). Version 7 of Yolo, codenamed as Yolov7, is the integration of the focus layer, represented by a single layer, which is created by replacing the first three layers of Yolov3. This integration reduced the number of layers, and number of parameters and also increased both forward and backward speed without any major impact on the mAP (mean average precision). Note, any version of Yolo later than version 4 would be a good baseline model to start the training. It's just newer version of Yolo packs more features and benefits.

Based on Yolov7, the disclosure of the application indicates a particularly crafted training (based on video footages of local population), testing and evaluating of detection, tracking and re-identification models to achieve maximum people counting and gender-based counting accuracy.

With the benefits offered by the particularly crafted models (fast, accurate, efficient, and particularly customized for the application in human crowd tracking), there are many real and potential use cases under which a variety of business/intuitional needs are met.

Smart cities: People analytics comprising of people counting, occupancy monitoring can also be used in urban environments to optimize traffic flow, manage public spaces and improve upon public safety. Pedestrian traffic management can be a game changes in the modern smart cities where the emphasis will be on resource optimization and facilities maximization for a fairly larger population. Using an AI-based people analytics system, the municipalities and city planners can identify areas that may need more resources and improved infrastructure to improve the flow of people and traffic.

Transportation: People counting and analytics can also be used at the airports, train stations, bus and ferry terminals to monitor passengers' traffic and optimize capacity planning aimed at improving services and people experiences. By tracking the number of people entering existing in a given area, transportation organizations can better predict passengers demands and adjust the transportation schedule accordingly along with arrangements for the required number of staff to provide services.

Safety and Security: The people analytics technology can be used to monitor access to secure areas such as hospitals, airports, bus terminals, government buildings etc. Keeping track of the number of people entering/existing in a given area, security personnel can better manage and optimize available resources aimed at improving security and preventing overcrowding in those places Educational institutions: People analytics and monitoring applications have greater prospects in schools and universities to track student attendances and ensure compliance with the required occupancy limits. By intelligently tracking the number of people in a given classroom, lecture theatres, students lab, educators can better allocate required resources and plan for capacity needs and capacity augmentation. In addition, people analytics technology can help educators ensure that classrooms are not overcrowded and hence not losing out in terms of learning and teacher-student engagements. It also ensures that seasonal or pandemic rules like social distancing rules are correctly followed by a large majority of students in a given educational facility.

Retail shopping malls: Similarly, people counting and occupancy monitoring with analytics system can be very useful to monitor customers traffic and optimize the availability of staff at various levels and time slots. By analyzing foot traffic entering/existing shopping malls and stored, businesses can determine the busiest times of the day, month, season etc. As a result, they can allocate staff resources accordingly, and optimize store layouts to improve the overall customers experience while they remain at the premise.

Sports & entertainment: Sports and entertainment feature high in people' lives and authorities ensure that every sports event takes place without any mayhem or unexpected incident. In order to keep track of the number of people, their subcategories like individuals, families, kids along with gender and age attributes, AI-based people counting and analytics will be of huge significance. An accurate system will prevent crowd density formation to avoid stampede and entry and exit can be easily arranged through the help of an intelligent people monitoring and analytics system.

Heritage: People analytics including people counting, occupancy monitoring, idle people detection, crowd density prediction at heritage sites makes a good use case for organizers to ensure artifacts get even attention. In order to keep track of people visiting certain artifacts in a day, week and months enable organization improve upon the experiences of people visiting the heritage sites like museums, art galleries, antiques exhibitions etc.

SUMMARY OF THE DESCRIPTION

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The purpose of the present disclosure is to resolve the aforementioned problems and/or limitations of the conventional technique, that is, to provide a technology-enabled crowd analysis capability for accurately detecting, identifying, counting, classifying, and tracking people from one or more video footages of crowd scenes.

Provided is a computer-implemented method for crowd analysis, comprising: training an artificial intelligence (AI) model based on a pre-collected dataset of human images in which each human image is annotated for its body and face to enable the AI model to detect humans based on body or face appearance thereof; deploying the AI model into a production environment, wherein the production environment comprises a computing system, and at least one photographing devices; receiving a video sequence of a crowd from a photographing device; preprocessing the video sequence, wherein the preprocessing the video sequence includes extracting a plurality of frames from the video sequence, removing noise from the video sequence, and subtracting background information from the video sequence; detecting, for each frame of the plurality of frames, a plurality of persons, and, for each person of the plurality of persons, extracting a plurality of global and local special features of the person that can be used for tracking the person in the video sequence, identifying the person based on the plurality of global and local features of the person including body features, clothing features, or facial features; re-identifying, for each frame of the plurality of frames, the plurality of persons detected from each frame by monitoring whether there is re-appearance, for each person of the plurality of persons, across a plurality of a pre-determined number of frames of the plurality of frames, wherein the re-identifying maintains a same identification for a person of the plurality persons across the person's all appearances across the plurality of the pre-determined number of frames; counting persons from the video sequence of the crowd to produce a counting report; classifying persons from the video sequence of the crowd to produce a classifying report; outputting the counting report and the classifying report.

In one embodiment of the provided method, wherein counting persons is based on gender features of the plurality of persons detected for each frame of the plurality of frames, and classifying persons is based on gender features of the plurality of persons detected from each frame of the plurality of frames.

In another embodiment of the provided method, wherein the outputting the counting report and classifying report comprises displaying the counting report and classifying report.

In another embodiment of the provided method, wherein the outputting the counting report and classifying report comprises analyzing the counting report and classifying report for the purpose of meeting one or more institutional needs.

In another embodiment of the provided method, it further comprises receiving a second video sequence of the crowd from a second photographing device, wherein the second photographing device is non-overlapping disjoint with the photographing device; preprocessing the second video sequence, wherein the preprocessing the second video sequence includes extracting a plurality of frames from the second video sequence, removing noise from the second video sequence, and subtracting background information from the second video sequence; detecting, for each frame of the plurality of frames extracted from the second video sequence, a plurality of persons, and, for each person of the plurality of persons, extracting a plurality of global and local features of the person that can be used for tracking the person in the second video sequence, identifying the person based on the plurality of global and local features of the person; re-identifying, for each frame of the plurality of frames extracted from the video sequence and the second video sequence, the plurality of persons detected from each frame of the plurality of frames extracted from the video sequence and each frame of the plurality of frames extracted from the second video sequence by monitoring whether there is re-appearance, for each person of the plurality of persons, across a plurality of a second pre-determined number of frames of the plurality of frames extracted from the video sequence and the second video sequence, wherein the re-identifying maintains a same identification for a person of the plurality persons across the person's all appearances across the plurality of the pre-determined number of frames among the plurality of frames extracted from the video sequence and the second video sequence.

In another embodiment of the provided method, wherein the re-identifying step further comprises using a deep learning algorithm to detect whether two persons detected from two frames are the same person, wherein the deep learning algorithm is pretrained to attain a loss function that makes a distance between two images each of which is of a same person as small as possible and the distance between two images each of which is of a different person as large as possible.

In another embodiment of the provided method, wherein the training an artificial intelligence (AI) model step comprises: modifying a Yolov7 model pretrained on an image-set of crowd human to obtain a set of hyperparameters used for the Yolov7 model to achieve a better detection accuracy, wherein the image-set of crowd human has one or more annotation labels for each image therein; analyzing the labeling annotation strategy of the image-set of crowd human and then parsing through all images in the image-set of crowd human to determine any inconsistency of the one or more annotation labels for each image in the image-set of crowd human, correcting all the inconsistent labels in the image-set of crowd human; retraining the Yolov7 model with the image-set of crowd human to produce a new version of the Yolov7 model, investigating if the new version of the Yolov7 model would produce a same set result as the previous version of the Yolov7 model in running against a same set of test data, and updating the previous version of the Yolov7 model with the new version of the Yolov7 model in the case of that the new version of the Yolov7 model outperforms the previous version of the Yolov7 model; retraining the new version of the Yolov7 model with only an image-set of human body to make the new version of the Yolov7 model detect humans from images based on imagery of human bodies only as opposed to imagery of human bodies and human faces; integrating the new version of the Yolov7 model in a semi-production environment, and generating a batch of labeled images by running the new version of the Yolov7 model on a semi-production dataset; correcting any labeling mistakes in the batch of labeled images according to a set of pre-determined labeling strategies; converting annotations on all images in the batch of labelled images according to the format of the image-set of crowd human; evaluating the performance of all versions of the Yolov7 models running on the batch of labeled images in terms of accuracy of detection, and determining the performance trend across all previously versions of the Yolov7 models; retraining the latest version of the Yolov7 model with a new batch of data that is different from any batch of data previously used; repeating the steps from 5 to 9, until reaching a pre-determined threshold of detection accuracy; and outputting the latest version of the Yolov7 model as the AI model.

In another embodiment of the provided method, wherein the training an artificial intelligence (AI) model is conducted based on a locally collected image-set containing images of local Arab people's clothing custom in which females wear Abaya and males wear Shimaagh.

In another embodiment of the provided method, further comprise benchmarking the performance of detecting people, counting detected people and classifying detected people, and retraining the AI model in an interactive way, in the case of that the benchmarking produces an unsatisfactory result, based on a plurality of custom dataset until the benchmarking produces a satisfactory result.

In another embodiment of the provided method, wherein the classifying step uses a file and folder directory structure in the production environment to facilitate the classifying step.

Provided is a system, comprising: a computing device, one or more photographing devices, wherein the computing device comprises a GPU, a processor, one or more computer-readable memories and one or more computer-readable, tangible storage devices, one or more input devices, one or more output devices, and one or more communication devices, and wherein the one or more photographing devices are connected to the computing device for feeding one or more captured video streams of human crowd scenes to the computing device's video buffer, and the computing device, prior to receiving the one or more captured video streams of human crowd scenes from the one or more photographing devices, to perform operations of training an artificial intelligence (AI) model based on a pre-collected dataset of human images in which each human image is annotated for its body and face to enable the AI model to detect humans based on body or face appearance thereof; and deploying the AI model into a production environment, wherein the production environment comprises a computing system, and at least one photographing devices, and wherein the computing device, upon receiving a video sequence of a crowd from one of the one or more photographing devices, to perform operations comprising: preprocessing the video sequence, wherein the preprocessing the video sequence includes extracting a plurality of frames from the video sequence, removing noise from the video sequence, and subtracting background information from the video sequence; detecting, for each frame of the plurality of frames, a plurality of persons, and, for each person of the plurality of persons, extracting a plurality of global and local special features of the person that can be used for tracking the person in the video sequence, identifying the person based on the plurality of global and local features of the person including body features, clothing features, or facial features; re-identifying, for each frame of the plurality of frames, the plurality of persons detected from each frame by monitoring whether there is re-appearance, for each person of the plurality of persons, across a plurality of a pre-determined number of frames of the plurality of frames, wherein the re-identifying maintains a same identification for a person of the plurality persons across the person's all appearances across the plurality of the pre-determined number of frames; counting persons from the video sequence of the crowd to produce a counting report; classifying persons from the video sequence of the crowd to produce a classifying report; outputting the counting report and the classifying report.

In an embodiment of the provided system, wherein counting persons is based on gender features of the plurality of persons detected for each frame of the plurality of frames, and classifying persons is based on gender features of the plurality of persons detected from each frame of the plurality of frames.

In another embodiment of the provided system, wherein the outputting the counting report and classifying report comprises displaying the counting report and classifying report.

In another embodiment of the provided system, wherein the outputting the counting report and classifying report comprises analyzing the counting report and classifying report for the purpose of meeting one or more institutional needs.

In another embodiment of the provided system, the computing device to perform operations further comprising:

receiving a second video sequence of the crowd from a second photographing device, wherein the second photographing device is non-overlapping disjoint with the photographing device; preprocessing the second video sequence, wherein the preprocessing the second video sequence includes extracting a plurality of frames from the second video sequence, removing noise from the second video sequence, and subtracting background information from the second video sequence; detecting, for each frame of the plurality of frames extracted from the second video sequence, a plurality of persons, and, for each person of the plurality of persons, extracting a plurality of global and local features of the person that can be used for tracking the person in the second video sequence, identifying the person based on the plurality of global and local features of the person; re-identifying, for each frame of the plurality of frames extracted from the video sequence and the second video sequence, the plurality of persons detected from each frame of the plurality of frames extracted from the video sequence and each frame of the plurality of frames extracted from the second video sequence by monitoring whether there is re-appearance, for each person of the plurality of persons, across a plurality of a second pre-determined number of frames of the plurality of frames extracted from the video sequence and the second video sequence, wherein the re-identifying maintains a same identification for a person of the plurality persons across the person's all appearances across the plurality of the pre-determined number of frames among the plurality of frames extracted from the video sequence and the second video sequence.

In another embodiment of the provided system, wherein the re-identifying step further comprises using a deep learning algorithm to detect whether two persons detected from two frames are the same person, wherein the deep learning algorithm is pretrained to attain a loss function that makes a distance between two images each of which is of a same person as small as possible and the distance between two images each of which is of a different person as large as possible.

In another embodiment of the provided system, wherein the training an artificial intelligence (AI) model step comprises: modifying a Yolov7 model pretrained on an image-set of crowd human to obtain a set of hyperparameters used for the Yolov7 model to achieve a better detection accuracy, wherein the image-set of crowd human has one or more annotation labels for each image therein; analyzing the labeling annotation strategy of the image-set of crowd human and then parsing through all images in the image-set of crowd human to determine any inconsistency of the one or more annotation labels for each image in the image-set of crowd human, correcting all the inconsistent labels in the image-set of crowd human; retraining the Yolov7 model with the image-set of crowd human to produce a new version of the Yolov7 model, investigating if the new version of the Yolov7 model would produce a same set result as the previous version of the Yolov7 model in running against a same set of test data, and updating the previous version of the Yolov7 model with the new version of the Yolov7 model in the case of that the new version of the Yolov7 model outperforms the previous version of the Yolov7 model; retraining the new version of the Yolov7 model with only an image-set of human body to make the new version of the Yolov7 model detect humans from images based on imagery of human bodies only as opposed to imagery of human bodies and human faces; integrating the new version of the Yolov7 model in a semi-production environment, and generating a batch of labeled images by running the new version of the Yolov7 model on a semi-production dataset; correcting any labeling mistakes in the batch of labeled images according to a set of pre-determined labeling strategies; converting annotations on all images in the batch of labelled images according to the format of the image-set of crowd human; evaluating the performance of all versions of the Yolov7 models running on the batch of labeled images in terms of accuracy of detection, and determining the performance trend across all previously versions of the Yolov7 models; retraining the latest version of the Yolov7 model with a new batch of data that is different from any batch of data previously used; repeating the steps from 5 to 9, until reaching a pre-determined threshold of detection accuracy; and outputting the latest version of the Yolov7 model as the AI model.

In another embodiment of the provided system, wherein the training an artificial intelligence (AI) model is conducted based on a locally collected image-set containing images of local Arab people's clothing custom in which females wear Abaya and males wear Shimaagh.

In another embodiment of the provided system, the computing device, prior to receiving the one or more captured video streams of human crowd scenes from the one or more photographing devices, to perform operations that further comprise benchmarking the performance of detecting people, counting detected people and classifying detected people, and retraining the AI model in an interactive way, in the case of that the benchmarking produces an unsatisfactory result, based on a plurality of custom dataset until the benchmarking produces a satisfactory result.

In another embodiment of the provided system, wherein the classifying step uses a file and folder directory structure in the production environment to facilitate the classifying step.

Other features and aspects will be apparent from the following detailed description, the drawings, and the claims.

BRIEF DESCRIPTION OF THE DRAWINGS

The present invention is illustrated by way of example and not limited in the figures of the accompanying drawings in which like references indicate similar elements.

DETAILED DESCRIPTION

Various embodiments and aspects of the inventions will be described with reference to details discussed below, and the accompanying drawings will illustrate some embodiments. The following description and drawings are illustrative of the invention and are not to be construed as limiting the scope of the invention. Numerous specific details are described to provide an overall understanding of the present invention to one of ordinary skill in the art.

Reference in the specification to "one embodiment" or "an embodiment" or "another embodiment" means that a particular feature, structure, or characteristic described in conjunction with the embodiment can be included in at least one embodiment of the invention but need not be in all embodiments. The appearances of the phrase "in one embodiment" in various places in the specification do not necessarily all refer to the same embodiment.

Embodiments use a computer system for receiving, storing and analyzing sample documents' images/videos data and for providing information to verify target documents that are in the same genre as the sample documents. The system, in particular, employs artificial intelligence techniques to train a predictive model to verify target documents.

Figure 1:
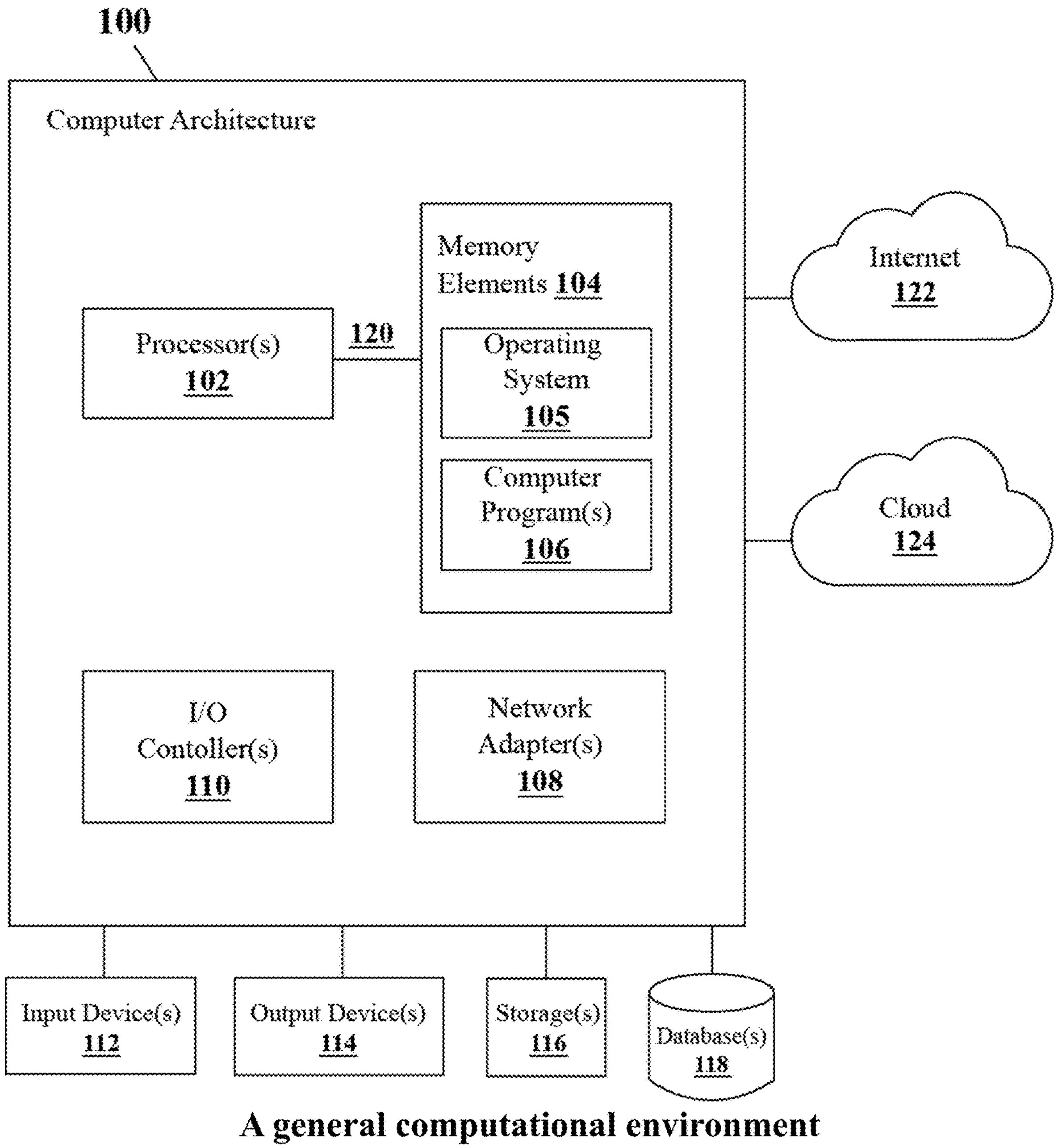
FIG. 1 illustrates, in a schematic block diagram, a computing environment being used in accordance with all embodiments. The environment, in all embodiments, may include artificial intelligence (AI) or machine learning (ML) features (not shown, but are implicitly represented as Computer Programs).

FIG. 1 illustrates a computer architecture 100 that may be used in accordance with certain embodiments. In certain embodiments, the raw sports data collection, storage, and process use computer architecture 100. The computer architecture 100 is suitable for storing and/or executing computer readable program instructions and includes at least one processor 102 coupled directly or indirectly to memory elements 104 through a system bus 120. The memory elements 104 may include one or more local memories employed during actual execution of the program code, bulk storage, and cache memories which provide temporary storage of at least some program code in order to reduce the number of times code must be retrieved from bulk storage during execution. The memory elements 104 include an operating system 105 and one or more computer programs 106, and the operating system 105, as understood by one skilled in the computer art, controls the operation of the entire computer architecture 100 and the architecture 100's interaction with components coupled therewith such as the shown components (input device(s) 112, output device(s) 114, storage(s) 116, databases 118, internet 122, and cloud 124) and unshown components that are understood by one skilled in the art, and the operating system 105 may be switched and changed as fit.

Input/Output (I/O) devices 112, 114 (including but not limited to keyboards, displays, pointing devices, transmitting device, mobile phone, edge device, verbal device such as a microphone driven by voice recognition software or other known equivalent devices, etc.) may be coupled to the system either directly or through intervening I/O controllers 110. More pertinent to the embodiments of disclosure are photographing devices as one genre of input device. A photographing device can be a camera, a mobile phone that is equipped with a camera, an edge device that is equipped with a camera, or any other device that can capture one or more images/videos of an object (or a view) via various means (such as optical means or radio-wave based means), store the captured images/videos in some local storage (such as a memory, a flash disk, or the like), and to transmit the captured images/videos, as input data, to either a more permanent storage (such as a database 118, a storage 116) or the at least one processor 102, depending on the demand of to where the captured images/videos are to be transmitted.

Input Devices 112 receive input data (raw and/or processed), and instructions from a user or other source. Input data includes, inter alia, (i) captured images of documents, (ii) captured videos of documents, and/or (iii) angles between the documents and the surface of the photographing device's optical lens that faces the documents and that is used when capturing the images/videos.

Network adapters 108 may also be coupled to the system to enable the data processing system to become coupled to other data processing systems or remote printers or storage devices through intervening private or public networks. Modems, cable modem and Ethernet cards are just a few of the currently available types of network adapters 108. Network adapters 108 may also be communicatively coupled to internet 122 and/or cloud 124 to access remote computer resources such as on-premise computing systems (not shown in FIG. 1).

The computer architecture 100 may be coupled to storage 116 (e.g., any type of storage device; a non-volatile storage area, such as magnetic disk drives, optical disk drives, a tape drive, etc.). The storage 116 may comprise an internal storage device or an attached or network accessible storage. Computer programs 106 in storage 116 may be loaded into the memory elements 104 and executed by a processor 102 in a manner known in the art.

Computer programs 106 may include AI programs or ML programs, and the computer programs 106 may partially reside in the memory elements 104, and partially reside in storage 116 and partially reside in cloud 124 or in an on-remise computing system via an internet 122.

The computer architecture 100 may include fewer components than illustrated, additional components not illustrated herein, or some combination of the components illustrated and additional components. The computer architecture 100 may comprise any computing device known in the art, such as a mainframe, server, personal computer, workstation, laptop, handheld computer, telephony device, network appliance, virtualization device, storage controller, virtual machine, smartphone, tablet, etc.

Input device(s) 112 transmits input data to processor(s) 102 via memory elements 104 under the control of operating system 105 and computer program(s) 106. The processor(s) 102 may be central processing units (CPUs) and/or any other types of processing device known in the art. In certain embodiments, the processing devices 102 are capable of receiving and processing input data from multiple users or sources, thus the processing devices 102 have multiple cores. In addition, certain embodiments involve the use of videos (i.e., graphics intensive information) or digitized information (i.e., digitized graphics), these embodiments therefore employ graphic processing units (GPUs) as the processor(s) 102 in lieu of or in addition to CPUs.

Certain embodiments also comprise at least one database 118 for storing desired data. Some raw input data are converted into digitized data format before being stored in the database 118 or being used to create the desired output data. It's worth noting that storage(s) 116, in addition to being used to store computer program(s) 106, are also sometimes used to store input data, raw or processed, and to store intermediate data. The permanent storage of input data and intermediate data is primarily database(s) 118. It is also noted that the database(s) 118 may reside in close proximity to the computer architecture 100, or remotely in the cloud 124, and the database(s) 118 may be in various forms or database architectures. Because certain embodiments need a storage for storing large volumes of photo image/video data, more than one database likely is used.

Computer Architecture 100 generically represents both a standalone computing device or an ensemble of computing devices such as, a computer server, or an ensemble of computer servers (server farm), a mobile computing device (such as a mobile phone), or a communicatively coupled and distributed computing resources that collectively have the elements and structures of the Computer Architecture 100.

In all embodiments, the Computer Architecture 100 is a system behind all kinds of deployment environment: training environment (for model training), test environment (for testing trained model), semi-production environment (for beta testing trained model in a close-to-production environment, and production environment.

Because certain embodiments need a storage or buffer for storing large volumes of video footages, more than one database likely is used.

Figure 2:
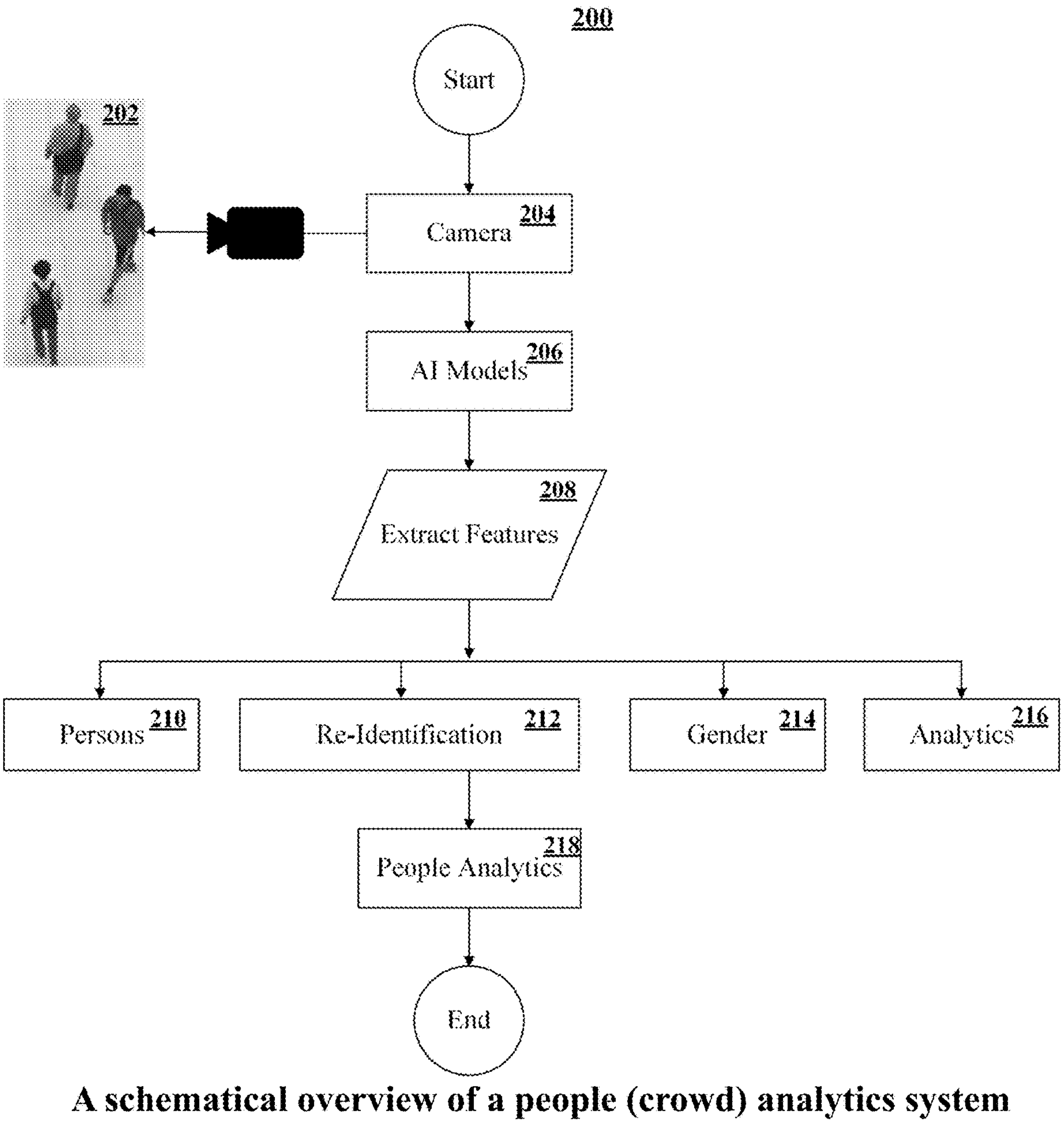
FIG. 2 schematically illustrates a general overview of a people analytics system applied in a crowd scenario.

Referring to FIG. 2, it shows an overview of a people analytics system in the context of crowd. In the setup of crowd analytic 200, one or more photographing devices 204 (such as a LIVE RTSP (Real time streaming protocol) camera) captures a crowd scene 200 and stream the video footages of the captured scene to one or more AI models 206. The one or more AI models 206 in turn process the footage data to extract various spatial features 208 (such as size, shape, etc.), and further proceed to detecting persons 210, re-identifying detected persons 212, gender-classification of detected persons 214, and other analytics upon detected persons 216, followed by overall people analytics 218 (such as statistical analysis of the crowd to find out deeper patterns). The overall feature presented in FIG. 2 can be different in different application context, and is subject to modification to accommodate the application context. But the general idea demonstrated in FIG. 2, regardless of the application context, would be understood to one skilled in the art.

Figure 3:
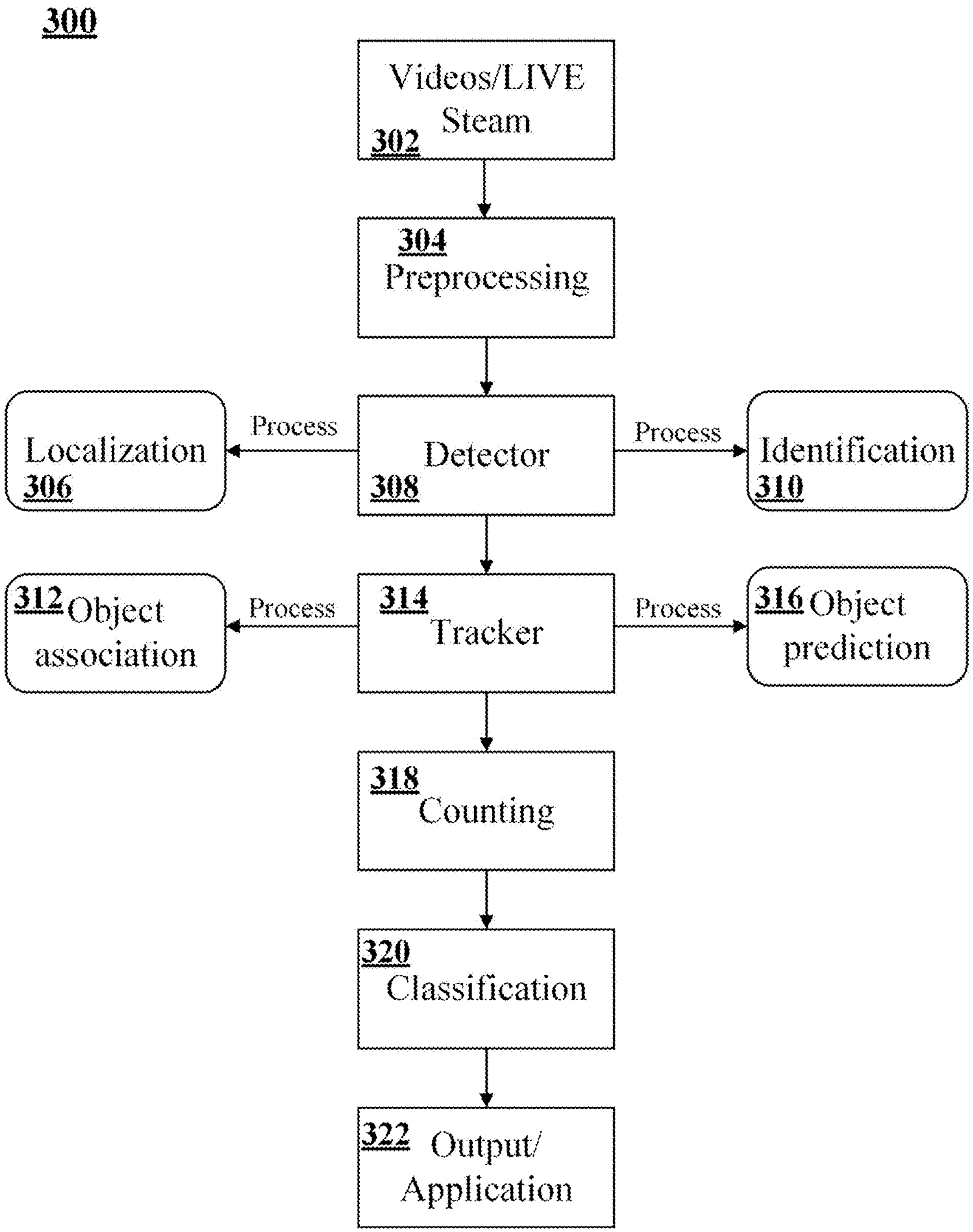
FIG. 3 schematically illustrates a flowchart of components involved in people counting analytics system

Referring to FIG. 3, flowchart 300 of components involved in people counting analytics system to demonstrate the methodology applied in all embodiments. In general, object detection algorithms in images that uses deep learning to detect objects in the images and videos and LIVE streams are applied. The algorithms use a combination of CNN (Convolutional Neural Network) and anchor boxes to detect persons of different sizes, look and feel and shapes.

First of all, a sequence of frames from a video or a CCTV (RTSP-enabled) camera 302 is passed through preprocessing 304 to format and clean the video data (for an example, noise removal from the video sequences and subtraction of background in order to extract out the foreground objects of interest. Note, in the application of all embodiments, the objects of interest in a video sequence are a person or many persons in a single frame). Then, video data, after being divided to multiple frames, is fed to a CNN based detector 308 to extract person features. The image of a single frame is then divided into a grid of cell and each cell is assigned a set of anchor boxes (a process called localization 306) which are pre-defined boxes of different sizes and aspect ratios that are used to predict the bounding boxes of the objects or persons in an image or multiple images (a process called identification 310).

Detected persons are passed to a tracker 314 module, which makes associations among persons being detected (312), and then makes prediction about the detected persons in terms of whether they are the same persons previously detected in one or more previous frames (316). This process is also called re-identification. After re-identification, people counting is conducted 318, which is to count detected persons only once despite their re-appearance in multiple frames. Afterwards, classifying detected and identified persons is conducted at 320, which is to classify them according to their features such as gender features, their height, or their size, etc. The last process 322 is to either output the result of counting and classification, or conduct a deeper analysis on the result report to find patterns of the detected persons (such as their movement speed around certain type of merchant goods in a mall, what sub-group of persons tend to cluster together, etc.)

The CNN-based detector 308 plays a vital role in the crowd analysis flow showed in FIG. 3. In order to have a capable detector 308, the CNN-based detector, as a model, needs to be trained to attain the ability to detect persons from a footage of crowd, as shown in FIG. 4.

Figure 4:
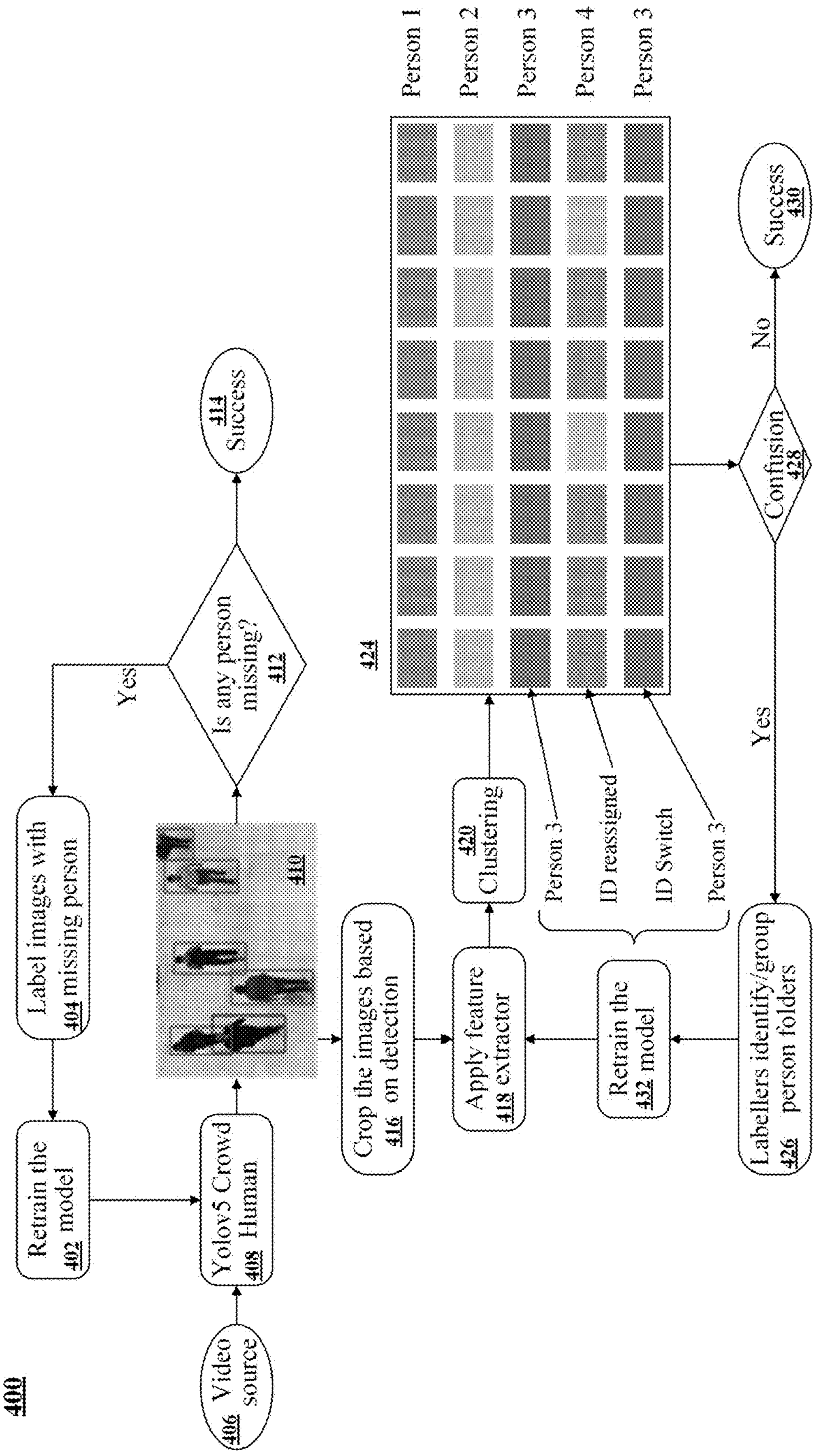
FIG. 4 shows a schematic diagram of model training and retraining.

Referring to FIG. 4, in the flow of 400, video source 406 is fed to a Yolov7 model that has been pre-trained on CrowdHuman (CrowdHuman is a benchmark dataset to better evaluate detectors in crowd scenarios. The CrowdHuman dataset is large, rich-annotated and contains high diversity. CrowdHuman contains 15000, 4370 and 5000 images for training, validation, and testing, respectively. There is a total of 470K human instances from train and validation subsets and 23 persons per image, with various kinds of occlusions in the dataset. Each human instance is annotated with a head bounding-box, human visible-region bounding-box and human full-body bounding-box. The dataset serves as a solid baseline and help promote future research in human detection tasks). The model detects persons from the video source 410, and at the quality control (QA) step 412, it is to be found out whether there is any person that should be detected is not detected. If the answer is no, then the model's training is deemed as successful (414). Otherwise, after labeling the image(s) with the missing person in the training dataset 404, the model is retrained at 402. The retrained model then goes through steps of 410, 412, 404, and 402 repeatedly until the QA step 412 produces success 414.

Detected persons 410 are used to crop the frame images into individual images of detected persons 416, which are used to apply feature extraction 418 thereupon to extract special features of each detected person. Then these detected persons are clustered at 420 to form a cluster table 424 in which each row lists a number of key features of a person (such as person 1, person 2, person 4, etc.) The table is then going through another QA process 428 to find out whether there is confusion among the tabled persons (such as whether there is redundantly identified persons). If there's no confusion, then the process is successfully concluded 430. Otherwise, the QA process further labels (re-identifies) and sorts the tabled persons with the help of files and folders that hold the person images in an orderly way 426.

Afterwards, the model is retrained at 432 to learn the re-identification of mis-identified person(s) that caused confusion at step 428. The retrained model is then applied to extract detected persons at step 418 again. The cycle of 418, 420, 424, 428, 426, and 432 repeats until the success 430 is produced (i.e., there is not mis-identification of detected persons).

In our embodiments, the method is to take videos and images and cropping off global and local features from each person in the frame for important feature extraction so that they can be tracked for some time and re-identified if re-appeared after a few frames in a video sequence. It is important to mention here that feature extraction of each person in every single frame becomes very laborious during tracking unless some persons are dropped if the person goes out of frame and never appeared again. There are various factors that have to be kept in mind with most important one being the occlusion due to crowd density. Occlusion prevents a person from re-appearing or his/her partial appearance confuses the system and prevents it in typical cases from re-identifying the same person. In order to address the challenge imposed by occlusion, the method resorts memories, to keep all the features in the short-term memory for every 500 frames in order to increase the chances of a person getting re-identified. With the help of memories, the overall error of mis-identification in the total number of people being counted is minimized.

The above-described model training and retraining, specifically, is based on 120,000 or more images that include western and middle eastern men and women of various age groups. Although tremendous advancements have taken place in the AI computer vision research particularly focusing on gender detection analytics, generalization of an AI model catered toward to a specific region of interest still poses a huge challenge. Gender detection is a powerful tool that can be used in a plethora of AI applications ranging from marketing to security, surveillance to employee attendance systems and controlling the flow of people to a POI (point of interest) at the time of an eventuality such as a COVID-19 Pandemic. The capacity of AI application to accurately identify and authenticate gender-based entries/exists, businesses and organizations can improve their services leading to making timely decisions based on accurate information. Some of the applications that can be built on the accurate gender-based counting systems include but not limited to customers segmentation, store layout optimization, staff allocation on a particular day of the week, product recommendation and sale optimization performance analysis etc.

As described in FIGS. 2 and 3, in the current person detection and tracking architecture behind all embodiments, various methodologies are adopted for people detection and tracking from surveillance or CCTV videos in order to make sense out of their movements, interests and preferences. There are several steps which are followed to implement a detection and tracking system. They include but not limited to: preprocessing, person detection, person tracking, person re-identification, people counting and people classification. These steps also are reflected in FIG. 5.

Figure 5:
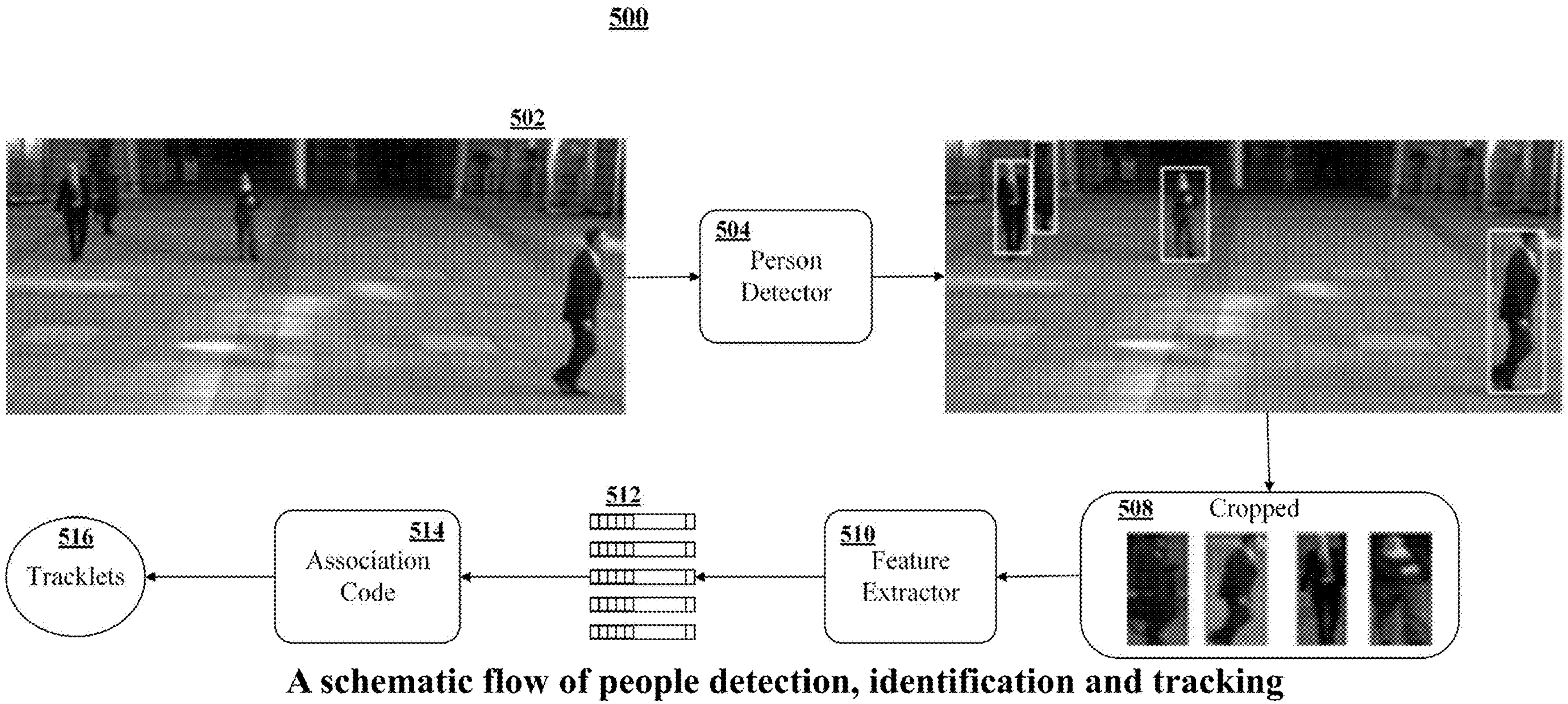
FIG. 5 shows a schematic flow of people detection, identification and tracking.

Referring to FIG. 5, the flow 500 includes feeding a frame of video footage 502 into a person detector model 504, which in turn detects a few persons (four persons boxed in boxes). Then, the person images are cropped out from the frame image to become four individual images of person 508. Each of the images of person are then processed by the Feature Extractor 510 to extract their respective spatial features (such as size, height, facial features, clothing, etc.). The results of the extraction are put into a table, each row of the table holding all extracted features for a person 512. The Association Code (a module) 514 then make associations among the detected persons based on table 512 (note, associations are used to remove redundant identification for a same person, a preparation for tracking and counting), and then Track-let 516 (a module for tracking and counting detected persons) tracks identified persons.

Figure 6:
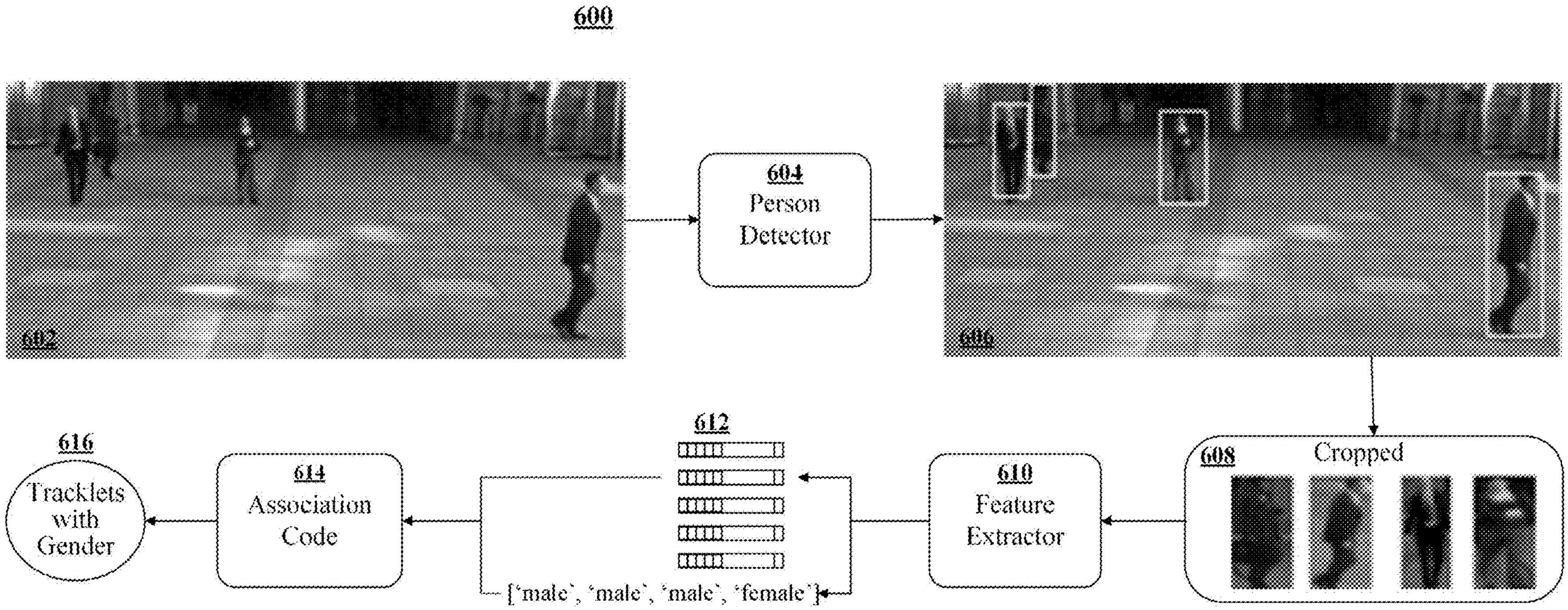
FIG. 6 shows a schematic flow of people detection (gender-based), identification and tracking.

Referring to FIG. 6, the flow 600 includes feeding a frame of video footage 602 into a person detector model 604, which in turn detects a few persons (four persons boxed in boxes). Then, the person images are cropped out from the frame image to become four individual images of person 608. Each of the images of person are then processed by the Feature Extractor 610 to extract their respective spatial features (such as size, height, facial features, clothing, etc.). The results of the extraction are put into a table, each row of the table holding all extracted features for a person 612. The Association Code (a module) 614 then make associations among the detected persons based on table 612 (note, associations are used to remove redundant identification for a same person, a preparation for tracking and counting), and then Track-let 616 (a module for tracking and counting detected persons) tracks identified persons. Note, FIG. 6 differs from FIG. 5 in that 604, unlike 504, detects not only persons from a frame but also the gender thereof. That is why feature extractor 610, when generating feature table 612, the gender of each detected person is also put into the feature table.

In order to detect the gender of a detected person, the training of the Re-ID and Gender-based models with the mixed custom-data set in order to cater to the gaps in the CrowdHuman dataset. In other words, the training data has customarily made images (images labelled with gender information, and/or gender-specific clothing information), in addition to the CrowdHuman dataset.

Figure 7:
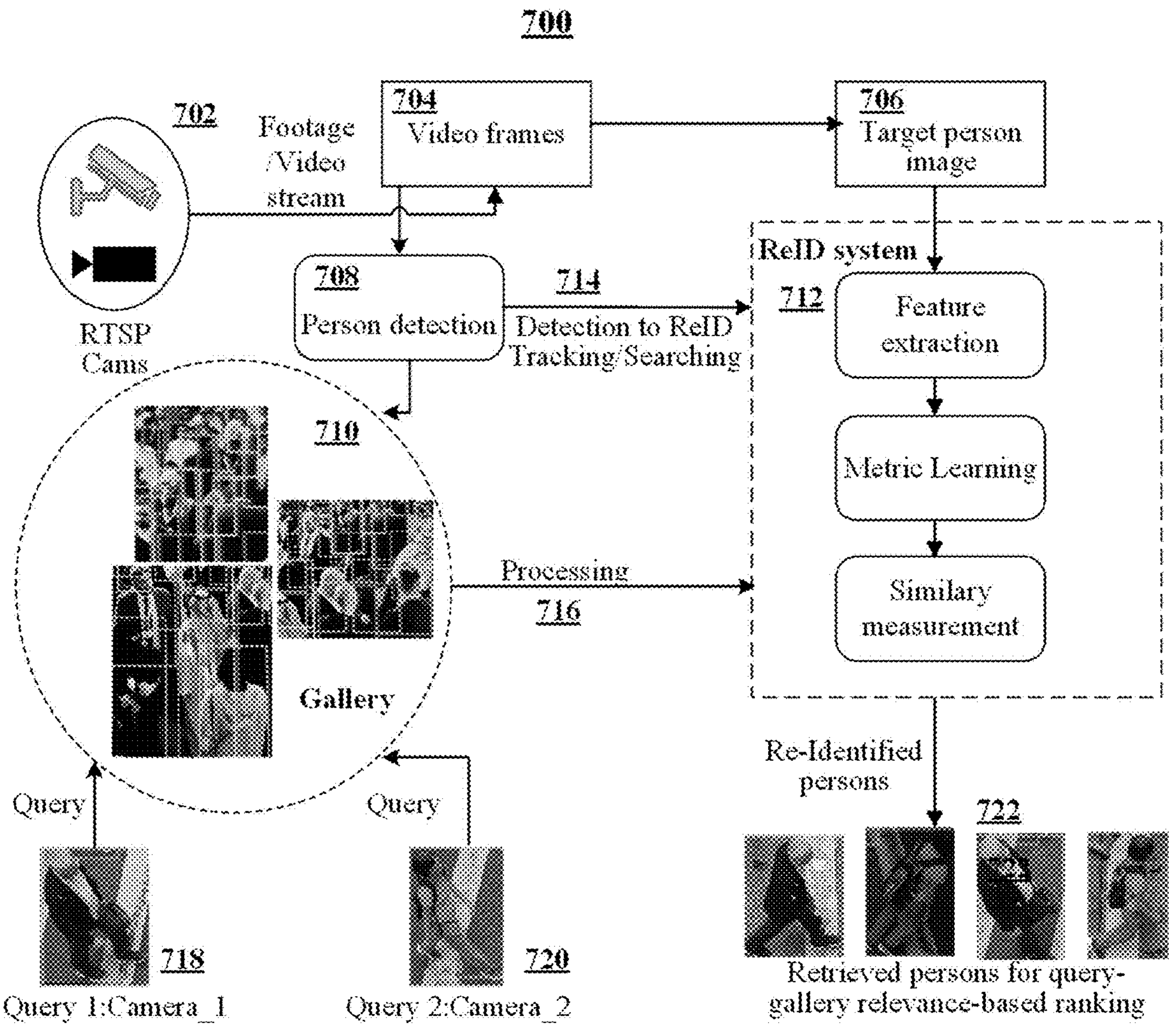
FIG. 7 schematically shows an application of one embodiment that involves querying one or more persons from a gallery via the ReID system.

Referring to FIG. 7, it schematically shows, in one embodiment, an application 700 of one embodiment that involves querying one or more persons from a gallery via the ReID system.

RTSP Cam(s) 702 capture a number of video footage streams, and the streams are then processed into video frames 704. Frames of footages are then fed into the Person Deteco for detection therefrom 708. Detected persons, being represented as their respective bboxed objects in the frames, are put into an image gallery 710.

In another route, video frames 704 can be used to extract target person images as well (706), via a person detector, and the target person images are input into a ReID system 712 for training the ReID system. 712 receives a large number of target person images 706, and goes through the process of feature extraction, metric learning (of the extracted features), and similarity measurement (finding similarities among features of different images). After the training, the ReID system 712 is able to uniquely identify a person even if the person appears in different frame images from different view perspective.

Once the ReID system 712 is ready, it can take tasks from either directly from the person detector 708 or directly from the Gallery 710. Since the output (detected and identified persons) from the Person detector 708 needs to be tracked, the detected and identified persons need to be re-identified before being properly tracked. As result, the information about the detected and identified persons are sent 714 to ReID system 712 for re-identification. And the outcome of the Re-Identification is used as input for the Trackor (not shown).

On the other hand, queries (such as the query 718 for searching a white-haired man captured in camera 1, the query 720 for searching a red T-shirted woman captured from camera 2) can be issued to the Gallery 710, which in turn processing the queries 716 by using the ReID system 712. The trained ReID system 712 then processes the queries, and returns cropped images of the queried persons in a relevance-based ranking 722. 722 shows that the white-haired man is found out from the Gallery in two different cropped images, each of which is apparently captured from a different angle of photographing, and not necessarily from the same camera. Similarly, the red T-shirted woman is found out from the Gallery in two different cropped images, each of which is apparently captured from a different angle of photographing, and not necessarily from the same camera.

Put in a different way, the FIG. 7 outlines a process flow of input streams getting processed into video frames and further forward passed to the custom-trained detection algorithm for bounding boxes localization and embedding feature extraction. A gallery of people is created from a single camera or multiple camera streaming inputs, ready to be queries by the tracking and ReID System in order to associate the unique ID to the tracklets (trackors). As long as the persons of interests (POIs) have a stored embeddings in the ReID system, the system will recognize it as the previously identified person and the re-Identification will continue to take place until the POIs either get disappeared from the scene, occluded for a prolong period of time or simply exit the camera streams. The ReID System keeps the duplicate in checks at the time of people counting and ensure that there is a robust embedding generation system with similarity matching algorithms obvious enough with clear-cut discriminant (based on local and global appearance features) which can be used to identify, track and re-assign the unique ID to them.

Figure 8:
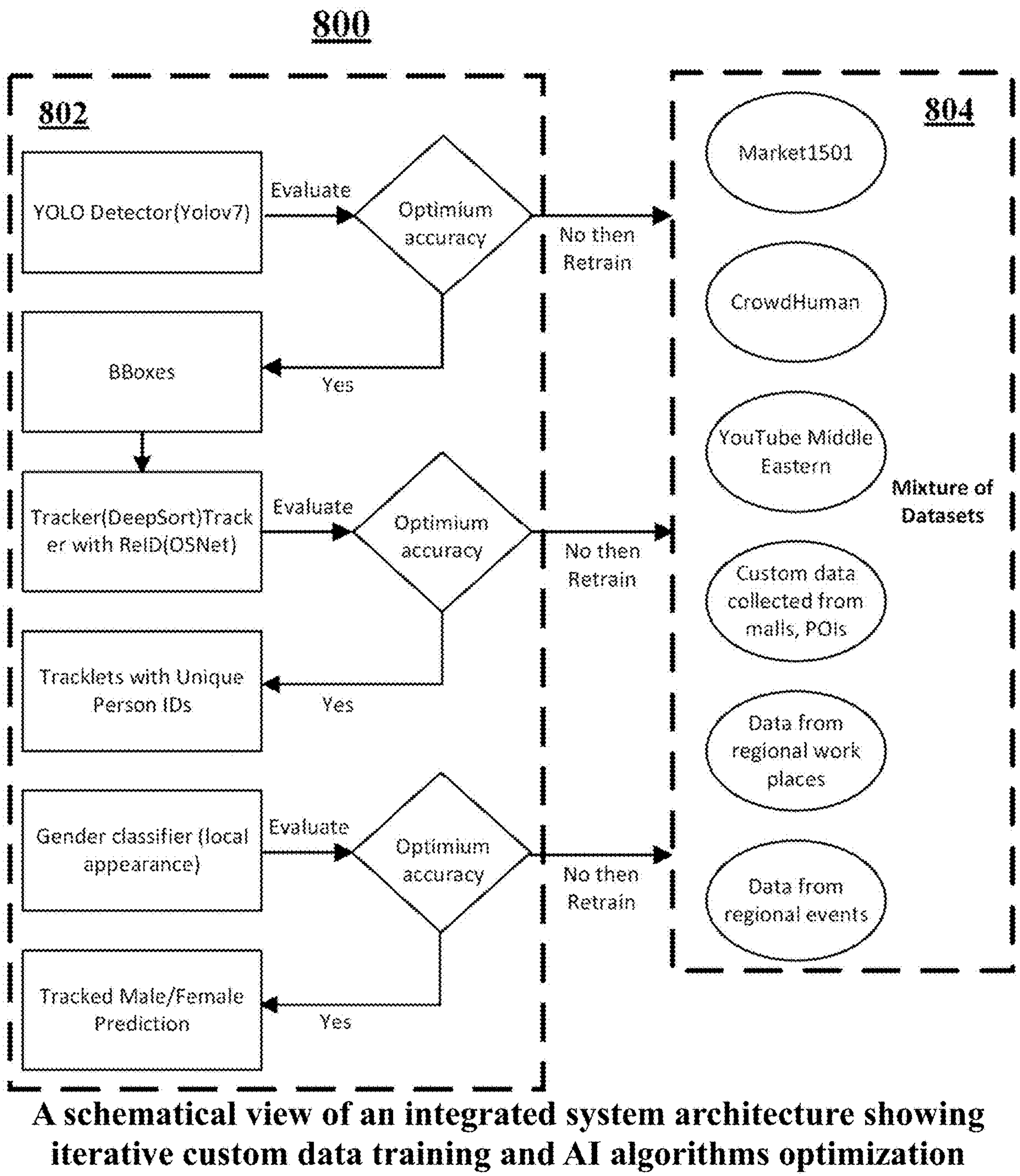
FIG. 8 is a schematical view of an integrated system architecture showing iterative custom data training and AI algorithms optimization.

In some embodiments, various models are trained on a variety of custom data sets in an interactive way. Note, for the detector model training, the model can start with one of the available versions of YOLO model, such as version 5 or version 7. FIG. 8 shows the baseline detector model is VOLO 7.

Referring to FIG. 8, in an interactive training setup 800, the models in the left-hand side of the diagram 802 (Yolo detector (based on Yolo V7), the Tracer (deepSort), or the Tracker with ReID (OSNet), and the Gender Classifier (based on local appearance) all go through a number of iterations of interactive training an a number of custom dataset in the right-handside of the diagram 804. In each iteration of the interactive training, the training result is quality controlled by asking whether the training produces an optimum (satisfactory according to a pre-set satisfactory threshold) accuracy, if the answer is "yes", then the train on the model is concluded. Otherwise, retraining is conducted.

More specifically, the YOLOv7 object detector receives input images or video stream from one or more RTSP cameras and outputs bounding boxes for detected objects, including people. The Deep SORT object tracker takes the bounding boxes from YOLOv7 as input and generates tracklets with unique IDs for each detected object. The ReID feature helps in maintaining consistent identities across frames. This has been achieved through rigorous training of an AI algorithm (ResNet50 backbone and OSNet ReID predictor) which has been fine tuned rigorously until optimum accuracy was achieved. The datasets in Figure above shows the extent to which the data collection from multiple venues was made possible with human annotators and labelers in the loop; this was needed to ensure several hundred images of a single person having a unique ID were validated before the OSNet ReID model was trained on the data iteratively until optimum accuracy was achieved.

Moreover, FIG. 8 explains that the tracklets are then passed through a gender classifier, a CNN model trained to classify gender based on visual features extracted from the bounding boxes (bboxes).

Finally, the gender classifier predicts whether each tracklet corresponds to a male or female, providing gender predictions associated with each detected object.

FIG. 8 illustrates the flow of information through the network, from object detection to gender classification, enabling the unified prediction of bounding boxes and tracklets with male and female predictions.

Each component of FIG. 8 can further be explained in the following section:

Input Data Preparation:

a. Obtain image data from Western and Arab datasets.
b. Preprocess the image data as required for input to the YOLO detector and gender classifier.

Object Detection Using YOLO:

a. Pass the preprocessed image data through the YOLO custom trained detector (trained on a mixture of datasets).

b. Receive bounding box coordinates and object class probabilities for detected objects, including people.

c. Evaluate the accuracy and performance function of the system in real time people detection to ensure maximum detection regardless of resolution and lighting variation as well as distance of people from the cameras' view field.

d. In case of further training and finetuning, add further sample of custom-collected regional data with data and model hyper parameters tuning to achieve optimal accuracy.

Object Tracking with Deep SORT and ReID:

a. Initialize the Deep SORT tracker with ReID feature using the OSNet model which takes image as input and learn the feature mapping of global and local features of detected persons to ensure the association of a unique tracker assignment.

b. Update the tracker with the bounding box coordinates obtained from YOLO.

c. Track objects across frames and maintain tracklets for each detected person throughout the video sequence or as long as the person doesn't get occluded for a long time or gets out of the camera view field.

d. Rigorous evaluation on both offline video as well as realtime video streams to ensure the algorithm has been trained on a right amount of regional custom-collected data until optimum accuracy is achieved. This steps also necessitates the intervention of human annotators and labelers to ensure the validation of data before the algorithm is trained on the previous and new dataset samples.

Gender Classification:

a. Extract regions of interest (ROIs) around each detected person using bounding box coordinates.

b. Pass the ROIs through the gender classifier.

c. Receive predictions for each person's gender (male or female).

d. Rigorous evaluation through the utilization of real and synthetic data to ensure the gender classification is as accurate as possible in multiple conditions including inside or outside of a particular premise Besides, the system shown in FIG. 8 can be expanded to include Ethnicity and Age Classification (not shown in FIG. 8, but mentioned in FIG. 9), which is to:

a. Further process the ROIs to obtain facial regions for ethnicity and age classification.

b. Pass the facial regions through ethnicity and age classifiers.

c. Receive predictions for each person's ethnicity and age.

The output from the various models can be integrated into an overall prection, a process called as Integration of Predictions:

a. Combine the bounding box coordinates, tracklets, gender predictions, ethnicity predictions, and age predictions for each detected person.

b. Generate unified predictions that include male/female classification along with ethnicity and age information for each person.

After outputs are integrated, an Output and Visualization process is conducted:

a. Display the unified predictions on the original images or output them in a suitable format for further analysis or visualization.

b. Optionally, visualize the tracked objects, their identities, and associated demographic predictions on video frames or in real-time.

The output can also evaluated and trigger further training for optimization. The process is called as Evaluation and Optimization:

a. Evaluate the performance of the integrated system using appropriate metrics such as accuracy, precision, recall, and F1-score.

b. Optimize the system parameters, models, and algorithms based on evaluation results and feedback.

After all models are trained and optimized, the next step is to deploy them and use them. The process is called as Deployment and Usage:

a. Deploy the integrated system for real-world applications such as surveillance, demographic analysis, or security.

b. Ensure the system meets performance and reliability requirements in practical scenarios.

c. Continuously monitor and update the system to adapt to changing conditions and improve accuracy over time.

Figure 9:
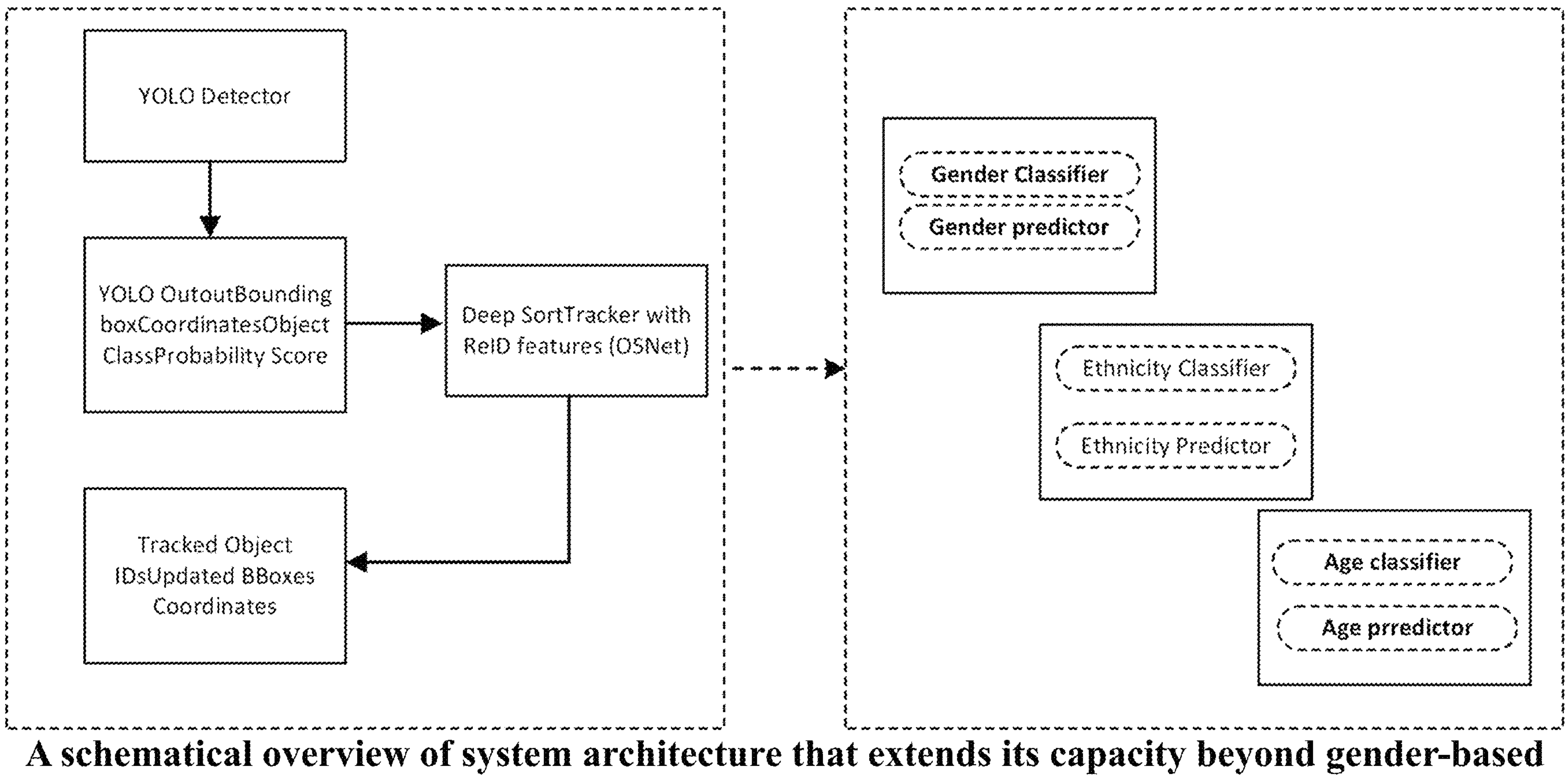
FIG. 9 is a schematical overview of system architecture that extends its capacity beyond gender-based predictor, and gender-based classifier.

Referring to FIG. 9, the system architecture shown in FIG. 8 can be extended to have other feature based classifier/predictor in addition to gender-based classifier/predictor.

In the system 900, each component is represented as a separate node, and arrows indicate the flow of data between them. The YOLO detector detects objects and outputs bounding box coordinates along with object class probabilities. These outputs are then used as inputs to the Deep SORT tracker, which tracks the objects and updates their bounding box coordinates over time. Simultaneously, the bounding box coordinates are passed to the gender classifier focusing on Arab persons classification and localization, ethnicity classifier (Arab & Non-Arab), and age classifier (Child, Adult, Elderly), which predict gender, ethnicity, and age based on the detected objects. Finally, the predictions from all classifiers are provided as the output of the system, in a form of an integrated output or a form of separate outputs.

FIG. 9 showcases the multi models' integration of person detection, tracking and classification algorithms to predict people, associate unique trackers with them based on their appearance, motion, and velocity attributes. It further enables the inventors to attach one or more people classification whether it is based on demographics, ethnicity, or gender attributes. Such added features in the invention ensure the interpretation of crowd (in addition to counting analytics) in terms of age groups, ethnicity, and gender classification. Such interpretation of real time crowd enables authorities and event organizers continuously make sense of the type of crowd to ensure health and safety of people at a given point of time. It also enables organizers of an event to establish demand-supply balance in a shopping mall or restaurants based on the type of families or crowd visiting an event or place of interest.

Figure 10:
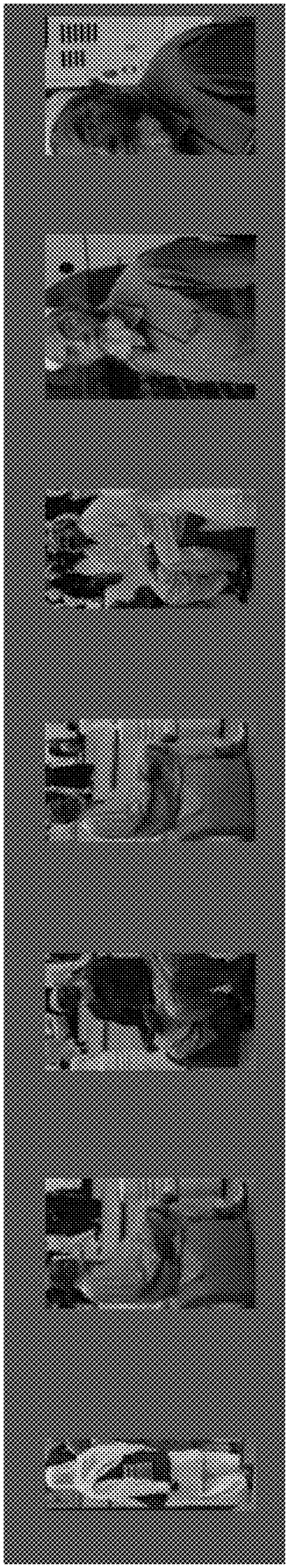
FIG. 10 demonstrates an image reel showing similar and different persons in a dataset, to be annotated and labelled by trained human (or machine-enabled automatic) annotators and labelers.

In training the model to be able to re-identify a detected person, the cropped images of detected person (508 and 608) are organized under a folder structure, in which each individual unique person's images are put in a folder separated from the folder that holds images for a different person. FIG. 10 demonstrates an image reel showing similar and different persons in a dataset, to be annotated and labelled by trained human (or machine-enabled automatic) annotators and labelers.

Figure 11:
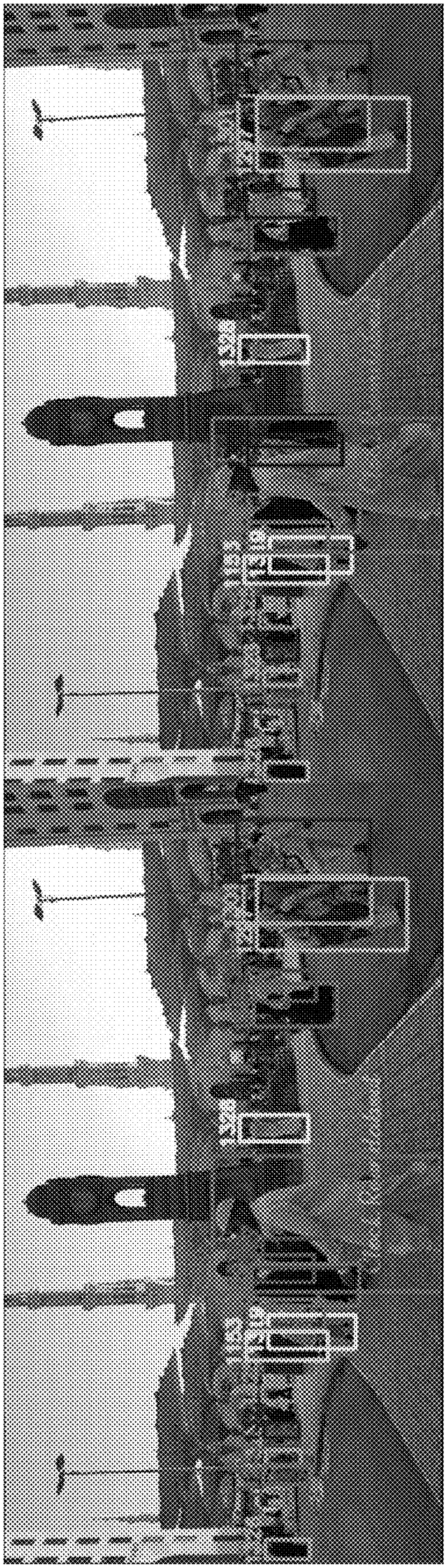
FIG. 11 shows an example of front and back frames (two consecutive frames) in a video sequence showing movement and changing positions, appearance with local/global features.

The goal of the annotation and labelling task include sorting the images into the following semi-structured folder structure wherein each folder holds one or more images for one person:

Folder-1:
1 st image
Folder-2:
2nd image
4th image
Folder-3:
3rd image
Folder-4:
5th image
Folder-5
6th image
7th image Referring to FIG. 11, an example of front and back frames (two consecutive frames) in a video sequence showing movement and changing positions, appearance with local/global features. The left-side photo shows a number of detected persons (shown as boxed persons), so does the right-side photo. The two photos, though, show different persons that appear in one photo but not in the other, due to the movement of the persons and occlusions caused by location changes.

With these semi-structured folders, the task of the labeler included:

1. Check if a folder contains images of all one person only. (Ideal case)
2. In case if the folder contains images of more than one person then create as many new folders such that each folder can contain the images of one person, and then move the images into respective folders. (Medium complexity)
3. Finally, merge the folders which contain the images of the same person. (Hard complexity) (Note: this is a hard task since there can be hundreds of the folders and there are chances that long-distance may contain the same person. As such, a long-term memory can be used to track the re-appearance after a long no-show among the hundreds of folders).

The task of the labeler also includes deleting images that are not of interest: in the cropped images-based folders, there are some cropped images that may contain some scenarios which are not of interest to us, in that case, the labeler should delete these types of images. Following is the list of cases, which the labeler should use as a guideline to delete the images.

1. In case if an image contains more than one fully visible person: A person is said is to be fully visible in the images if more than 70% of his body is the images. (Note: It is rather a subjective thing, and may depend on the labelers judgment). Note, if a person is fully visible in the image and other persons are partially visible, then the image is not supposed to be deleted.
2. If the size of is image is too small, and the labeler can't identify/differentiate the person in the image. (Note: Labeler can utilize the visualization on the full image part to identify the person, but in case it is still hard for him to identify then please delete the image.)
3. If an image doesn't contain any person or less than 40% of the person entered in the frames.

Figure 12:
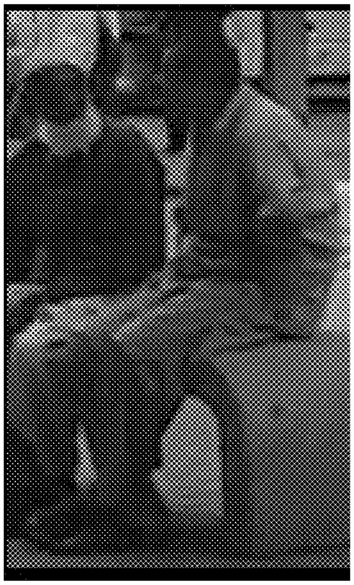
FIG. 12 shows a single frame showing two persons having different portions of their bodies visible

Referring to FIG. 12, it shows a single frame showing two persons having different portions of their bodies visible, i.e. 100% visible vs. 80% visible. According to above guideline rules, this frame image should not be deleted.

Person re-identification (Re-ID) technology uses AI computer vision to judge whether there is a specific or sought after person in a particular video sequence or images. This can be in a video sequence from a single camera or multiple non-overlapping disjoint cameras. This task is extremely challenging due to change in person poses, different camera views, local and global spatial features of persons and occlusions between several persons. It is a widely researched problem, explored alongside image or frame retrieval in a video sequence. Given a range of images, it asks the algorithm to retrieve the images of the person in question in a video sequence. AI deep neural networks integrates spatial features from two images/frames in a video sequence and ascertain whether the two images belong to the same person. Re-ID aims to make up for the visual limitation of the current fixed cameras and can be combined with custom-based person detection and tracking technology. Such technology is widely used in intelligent video monitoring, building security monitoring, heritage site analytics application and retail customers segmentation etc.

In all embodiments, the model for Re-ID is fine tuned to be more accurately re-identify persons from video sequences or images, and/or from difference sources of video sequences or images, by using above mentioned person images labelling, and using the labelled images to retrain the model.

Figure 13:
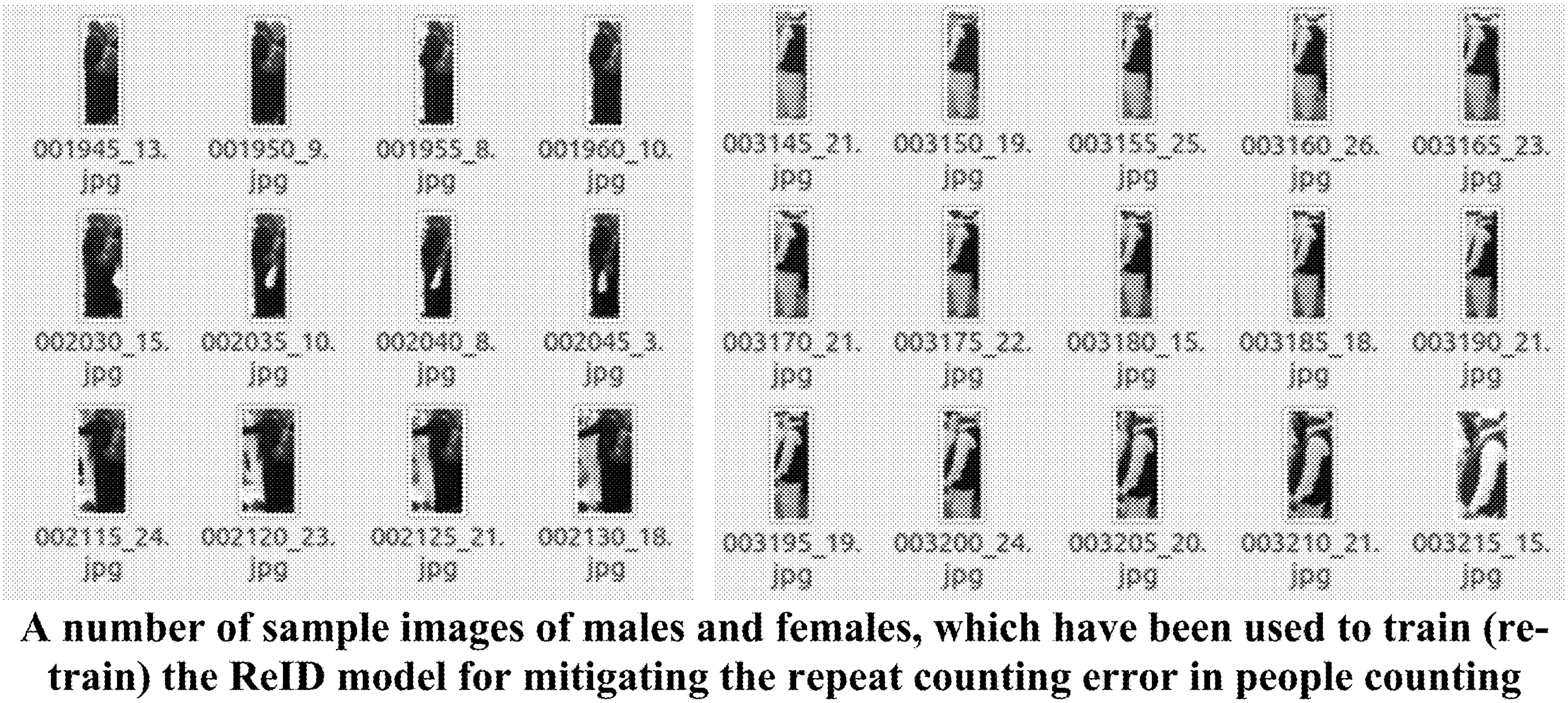
FIG. 13 shows a number of sample images of males and females, which have been used to train (re-train) the ReID model for mitigating the repeat counting error in people counting.

Referring FIG. 13, it shows a number of sample images of males and females, which have been used to train (re-train) the ReID model for mitigating the repeat counting error in people counting.

Retraining the ReID model involves datasets preparation: augmenting the image dataset of global people (world-wide people) with images of local people.

Specifically, we ran experiments on a variety of datasets to ensure the AI deep learning algorithms learn diverse set of features form global and local features of people like wearables, structure (height, appearance etc.) and number of appearances in a video sequence. We have trained the model on a mixed dataset which includes Market1501 (large-scale public benchmark dataset for person re-identification. It contains 1501 identities which are captured by six different cameras, and 32,668 pedestrian image bounding-boxes obtained using the Deformable Part Models pedestrian detector. Each person has 3.6 images on average at each viewpoint. The dataset is split into two parts: 750 identities are utilized for training and the remaining 751 identities are used for testing. In the official testing protocol 3,368 query images are selected as probe set to find the correct match across 19,732 reference gallery images.)

Positive Sample ReIDs Vs. Negative Sample ReIDs

We have trained a deep learning algorithms OSNet on a custom-dataset with a view to computing the loss function based on similarity between the two persons in two images in a video sequence. The loss function in our network makes the distance between the same person image (positive sample pair) as small as possible and the distance between different person images (negative sample pairs) as large as possible.

Gender-Based Re-ID Labeling

For this task, the goal is to classify each folder labeled for Person Re-id as either male or female. This task depends on the labeler if he/she (or an automatic software app) wants to create an xlsx/csv file with two columns one for folder id and the other for the gender or want two folders one with male folders and one with female folders from Person re-id task.

The following steps are to combine the person re-id and gender-based labeling task into one task to reduce the complexity of searching re-appearance of a person among a multiple folder:

1. Check if a folder contains images of all one person only. (Ideal case)

2. In case if the folder contains images of more than one person then create as many new folders such that each folder can contain the images of one person, and then move the images into respective folders. (Medium complexity)
3. Segregate the male and female folders into two different folders. (This step can reduce the searching complexity for step 4.)
4. Finally, merge the folders which contain the images of the same person. (Hard complexity) (Note: this is a hard task since there can be hundreds of the folders and there are chances that long-distance may contain the same person. As such, a long-term memory can be used to track the re-appearance after a long no-show among the hundreds of folders).

Gender Labelling Specification

Figure 14:
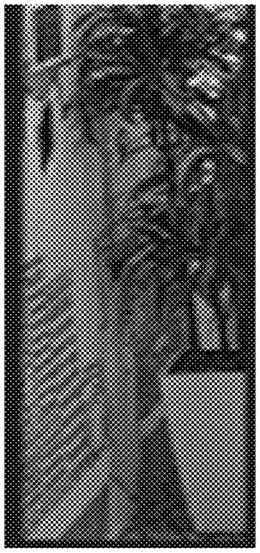
FIG. 14 shows, an image contains non-person objects is going to be deleted in a dataset sample distillation process.
Figure 15:
FIG. 15 shows a M (male) folder contains a cropped image of multiple males in one image.
Figure 16:
FIG. 16 shows a F (female) folder contains a cropped image of multiple females in one image.
Figure 17:
FIG. 17 shows all the cropped images that contain a mix of the males and females from the either M or F folder.

The goal of this section is to specify labelling requirements for the gender-based classification model. We have developed a gender-based person cropper tool which scrap off male and female instances from video sequences as well as 2D images. The program provides a directory structure comprising of Male (M) and Female (F) folders which are then given out to human labelers/annotators to rectify the misclassification. The annotator/labelers carry out the task using the following steps:

1. If there is any image in the M/F folder, that doesn't contain any person or any visibly recognizable person, then that image should be deleted. Like FIG. 14 shows, an image contains non-person objects is going to be deleted in a dataset sample distillation process.
2. If a M (male) folder contains a cropped image of multiple males in one image (as shown in FIG. 15), then those kinds of images are going to be deleted from the M folder as well.
3. Likewise, if a F (female) folder contains a cropped image of multiple females (as shown in FIG. 16), in one image), then those kinds of images are going to be deleted from the F folder as well.
4. All the cropped images that contain a mix of the male(s) and female(s) from the either M or F folder (as shown in FIG. 17, in which the left side photo shows a male and a couple of females, while the right-side photo shows a couple of females and one male).
5. Finally, at the end of this sample distillation process, the "M" folder should contain all the female images, and "F" would contain all the male images.
6. The annotator then renames the "F" as "M" since it would contain the male images and "M" as "F" for the same reason before submitting the whole folders of images.

Hybrid Yolo Detector

The detector is a Yolov7 based model (Utralytics) that is trained and evaluated on CrowdHuman dataset. As the CrowdHuman is a dataset that contains the annotation for both the human body and face, that is why the model is trained to predict body and face at the same time.

To integrate the model in our crowd-counter pipeline (as shown in FIG. 15), we picked the pre-trained model, and repurposed it in the context of our invention to make it compatible with the crowd-counter pipeline. The following steps were taken to further improve the performance of the repurposed model.

Steps Required to Improve the Detection:

1. Modify the Yolov7-crowdhuman pre-trained model (i.e. A Yolov7 model trained on the CrowdHuman dataset) algorithm for the training and figured out the hyperparameter used for the current training model to achieve the best accuracy.
2. Analyze and benchmark the CrowdHuman labeling annotation strategy and pointed out the inconsistency in the labeling procedure. These steps are necessary in understanding the nature of output from the model and rationalizing the kind of results the model produces.
3. Retrain the model with the same CrowdHuman dataset with no augmented data, and investigate if the retrained model produces the same results as the pre-retrained model. The retraining and investigation help to ascertain the model training configuration, and to pinpoint any bugs in the model code.
4. Retrain the same model with the human body annotation only this time. This re-training makes the model to make prediction for human body only as opposed to partial body or human face as observed in some prior art. In other words, this re-training makes the model focus on human body only.
5. Integrate the model trained on the human body in the crowd-counter pipeline, and generate the first batch of labeling images on the custom dataset.
6. Design and operationalize a labeling analogy document about how to correct the labeling mistakes from the images.
7. Once the labeling step is complete, download the annotations and write a parser to convert the annotations to the CrowdHuman format to train on the custom dataset.
8. Evaluate the labeled batch on the previously trained models and determine what kind of trend could emerge in consecutive trained models.
9. Retrain the model with new batch of data.
10. Repeat the steps from 5 to 9, until results produced by the retrained model reaches a pre-set threshold of satisfaction.

Note, above steps can be conducted in a training environment alone, or can be conducted in a training environment alone and then tested in a semi-production environment or a test environment.

Figure 18:
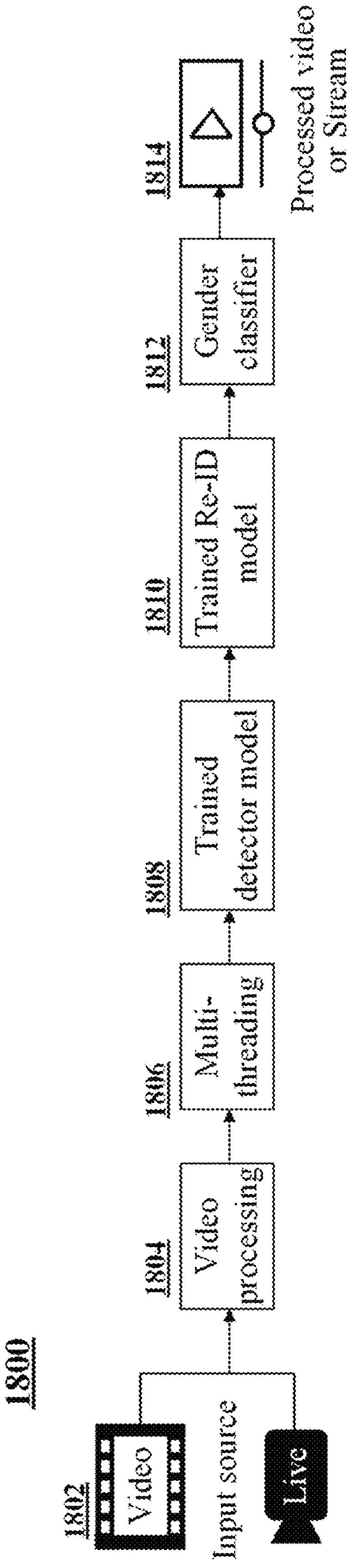
FIG. 18 shows a schematic crowd-counting pipeline.

Referring to FIG. 18, it shows a crowd-counting pipeline 1800, in which input source of video footages 1802 are captured by photographing devices and are streamed to video processing module 1804 (which pre-processing the stream(s)). In a multi-threading fashion (via, for example, a multi-thread management module 1806), the trained detector model 1808 processes pre-processed video image frames to make detections of persons. Detected persons are then re-identified by the trained Re-ID model 1810 to be re-identified (note, the trained detector model already identified each detected person, and the re-identifying is to make sure no person is assigned with multiple identification). Afterwards, the Gender Classifier 1812 classifies the detected and properly identified persons according to features associated with them (mainly the gender feature). Finally, the streamed video is processed by annotating detected persons with their ID and classification (1814) and the processed video is either outputted or going through deeper analysis (not shown).

Experimentation and Benchmarking

Thorough experimentation and benchmarking were performed to validate the accuracy of the detection, tracking and gender classification algorithms. Most of the algorithms in the online public space have been trained on people having some part of the skin visible including the face which makes it easily identifiable for a trained algorithm. However, such algorithms struggle to perform well on a dataset containing people videos and images wearing Abaya (a loose over-garment) which is meant for covering up the entire body of a person especially a female. Similarly, men wear a headcloth called Shimaagh, which is a piece of cloth designed for a desert environment to protect the wearer from sand and heat. In our dataset, collected from local regions include more than 80% of men and women wearing traditional dress (i.e. Abaya and Shimaagh) which was collected, annotated and labelled for training a detector model, tracking model and gender classification model as part of the people counting and occupancy monitoring system invention. The benchmarking validation analysis was conducted which involved the testing of pre-trained detection, tracking and gender classification model on locally collected videos. Such analysis informed us that using such models trained on non-Arab people datasets, we won't be able to achieve sufficient accuracy in terms of detection, tracking and gender classification. All that required us to thoroughly train ML algorithms on locally collected data with individual algorithms trained having different data parameters and hyper parameters. The performance of these individual algorithms has been demonstrated in some of the visualizations, shown below under Results & Evaluation section. The segmentation part is done using the features extracted from the model backbone to predict pixelwise areas of interest, the predicted areas are then passed as binary image masks into a dimension estimation network parallelly for each detected and identified element, which estimates the size thereof given the mask image reference.

Results and Evaluation

Figure 19:
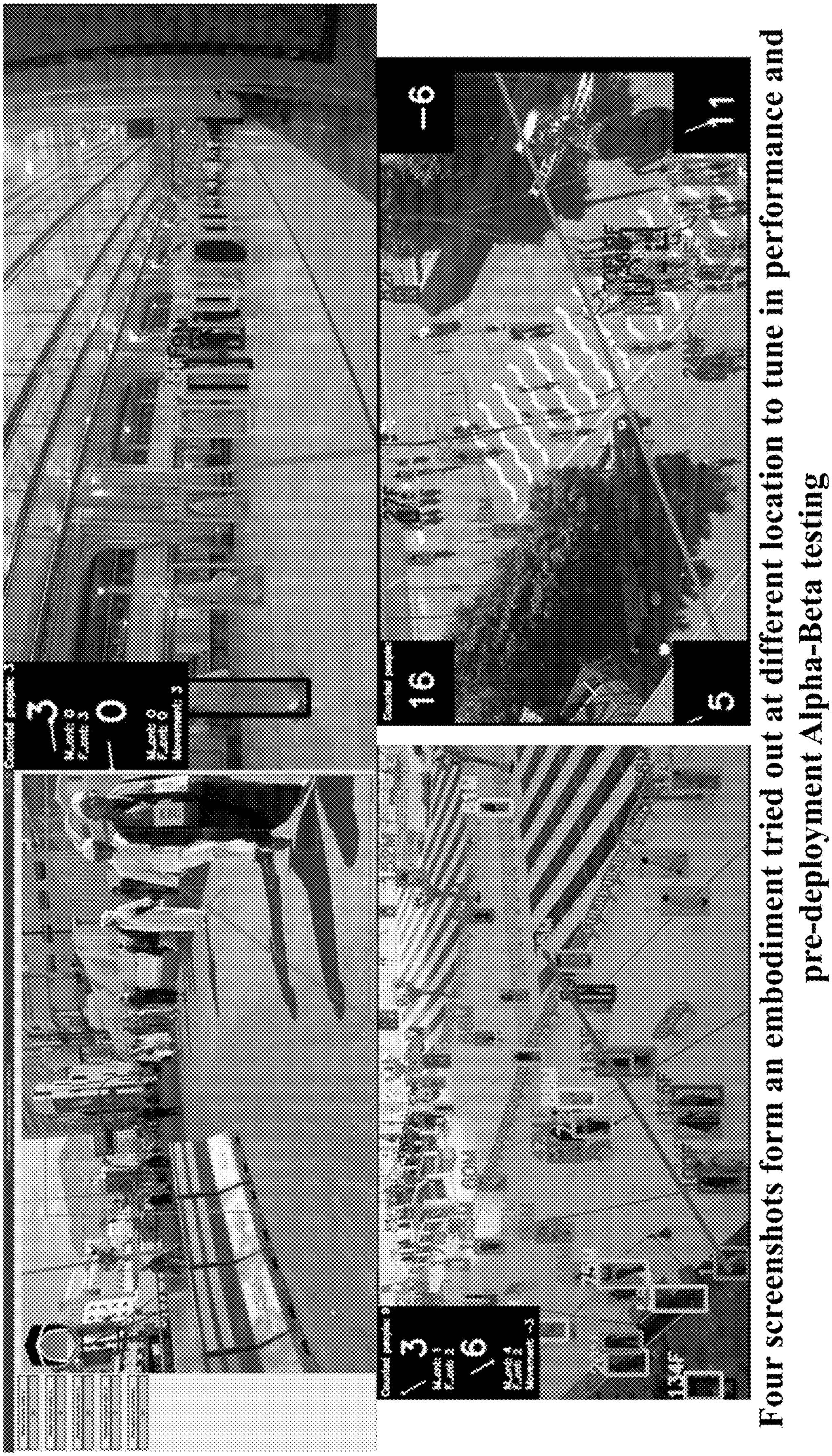
FIG. 19 shows four screenshots form an embodiment tried out at different location to tune in performance and pre-deployment Alpha-Beta testing.

FIG. 19 shows four screenshots form an embodiment tried out at different location to tune in performance and pre-deployment Alpha-Beta testing.

Figure 20:
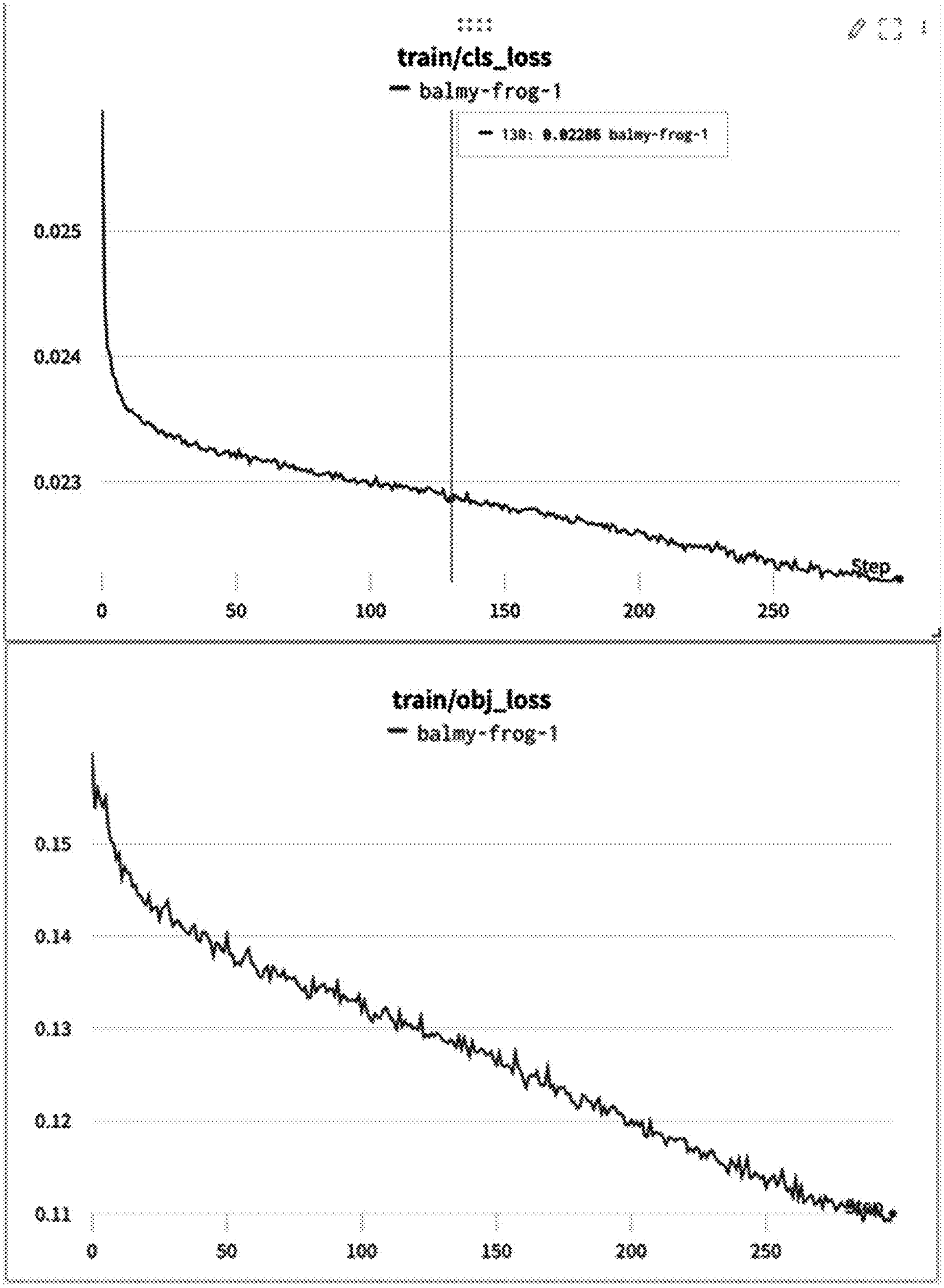
FIG. 20 shows the Train/Classification loss data for full and visible body detection of people wearing Arab dresses.

FIG. 20 shows the Train/Classification loss data for full and visible body detection of people wearing Arab dresses.

Figure 21:
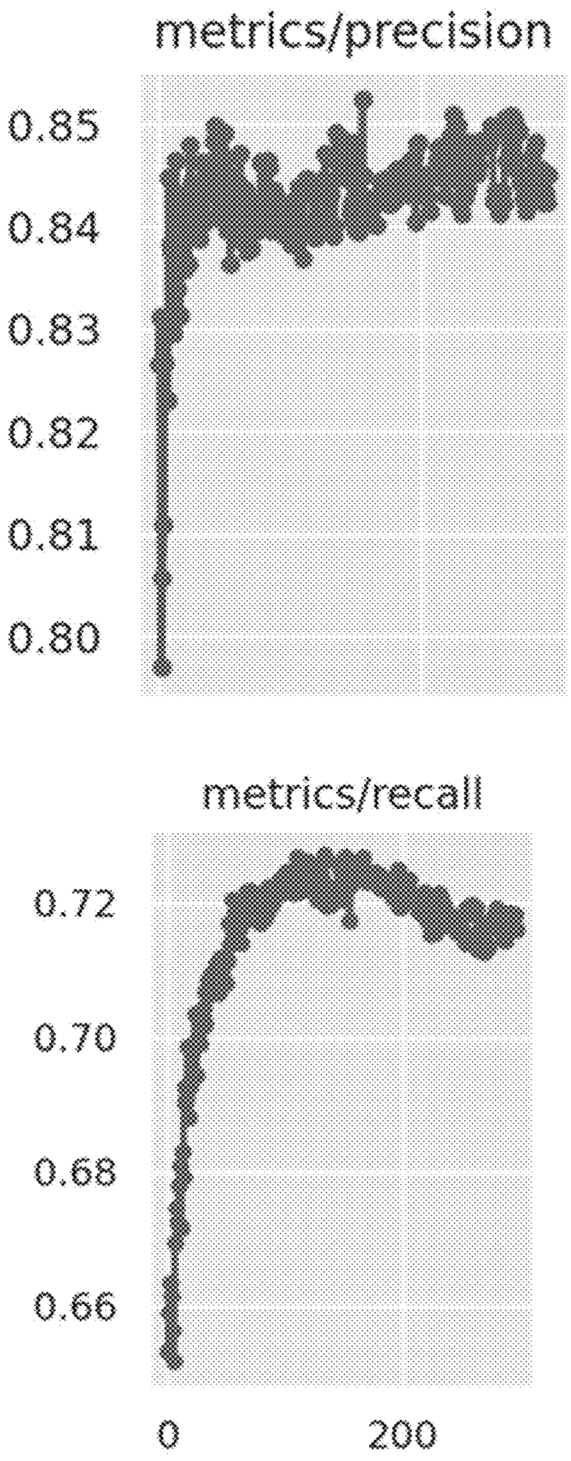
FIG. 21 shows the Precision and Recall data for full body and visible body detection of people wearing Arab dresses.

FIG. 21 shows the Precision and Recall data for full body and visible body detection of people wearing Arab dresses.

Figure 22:
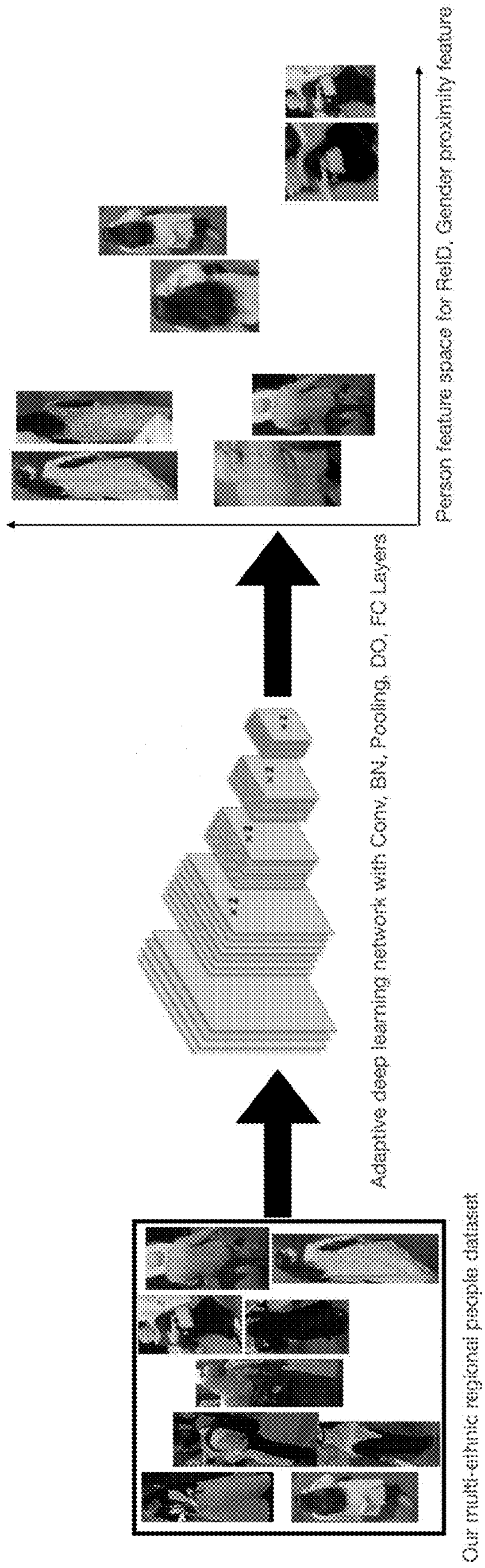
FIG. 22 shows the dataset, being fed to the trained algorithm to distinguish between similar and different persons based on local and global features including body features, look and feel, color of outfits, wearables etc.

FIG. 22 shows the dataset, being fed to the trained algorithm to distinguish between similar and different persons based on local and global features including body features, look and feel, color of outfits, wearables etc.

Gender-Based Model Performance on the Seen and Unseen Data

Figure 23:
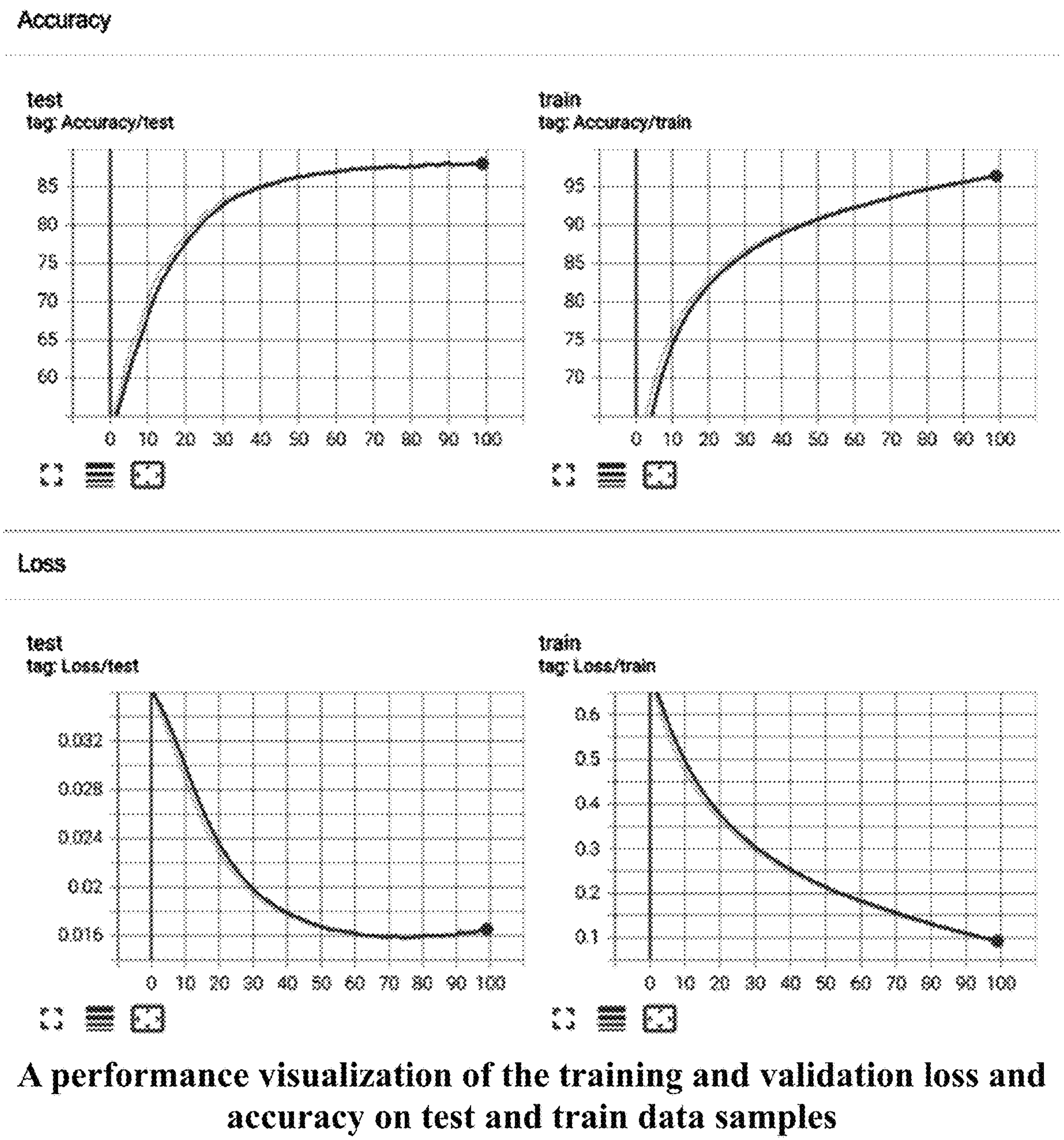
FIG. 23 shows performance visualization of the training and validation loss and accuracy on test and train data samples.

FIG. 23 shows performance visualization of the training and validation loss and accuracy on test and train data samples.

Visible Body Bbox Only Detection Performance

After training the YOLOV7 (in some embodiments, YOLOV7 is used) CrowdHuman detection model on a custom annotated dataset, we calculate average precision for each class based on the model prediction, as shown below.

Figure 24:
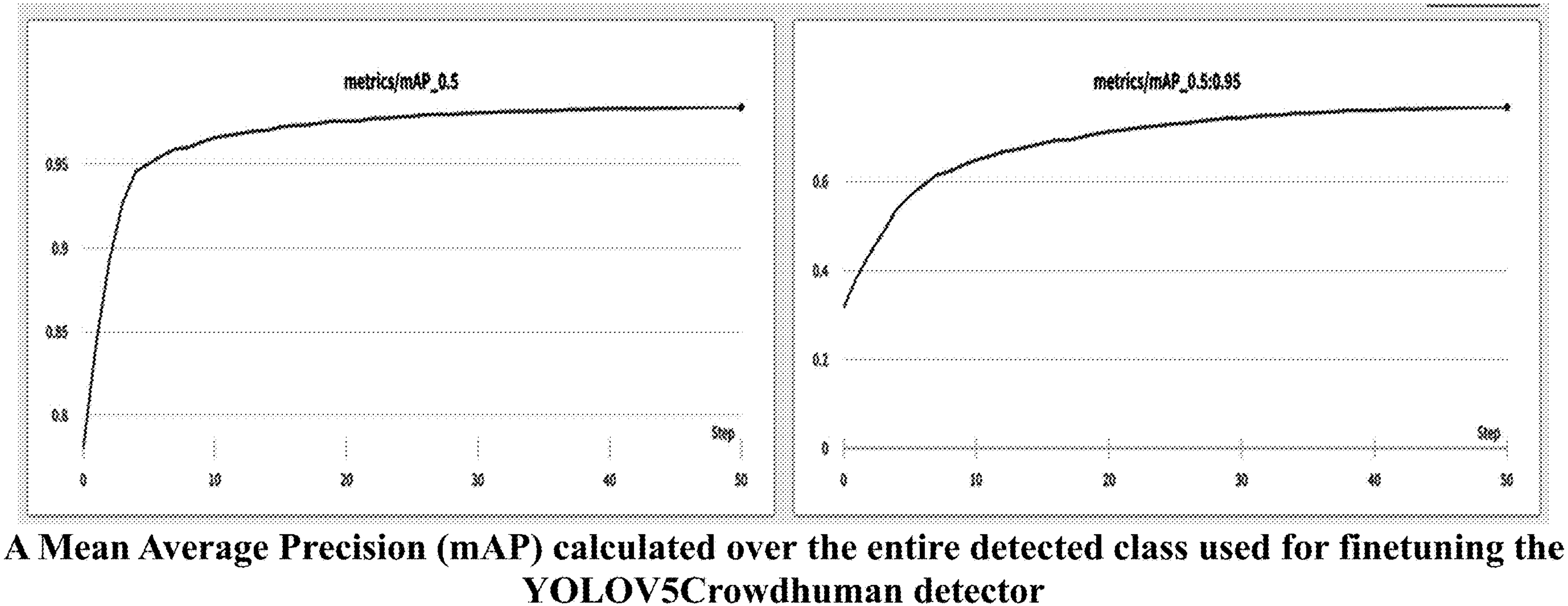
FIG. 24 shows Mean Average Precision (mAP) calculated over the entire detected class used for finetuning the YOLOV7Crowdhuman detector.

FIG. 24 shows Mean Average Precision (mAP) calculated over the entire detected class used for fine tuning the YOLOV7CrowdHuman (or VOLOV7CrowdHuman) detector.

Figure 25:
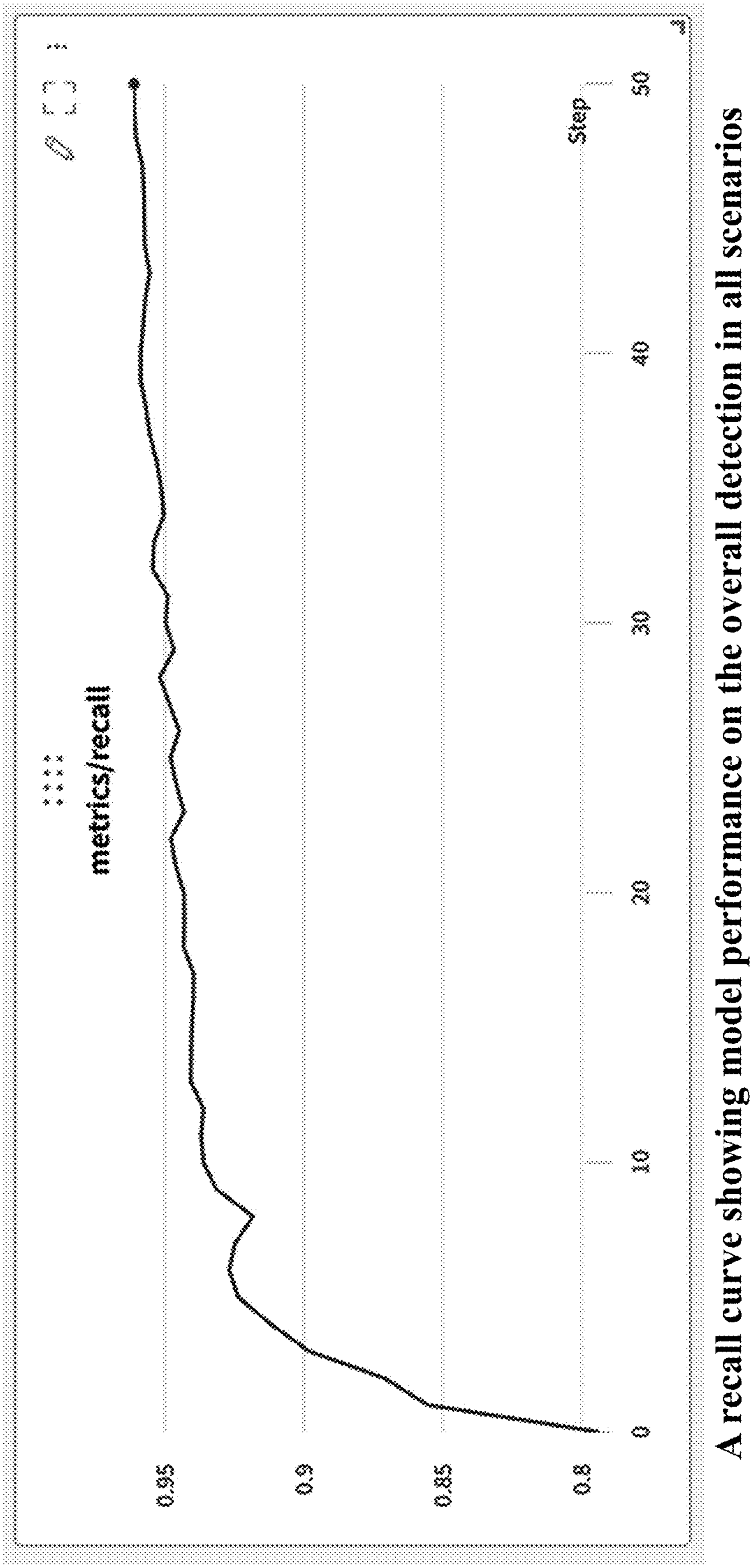
FIG. 25 shows recall curve showing model performance on the overall detection in all scenarios.

FIG. 25 shows recall curve showing model performance on the overall detection in all scenarios.

Figure 26:
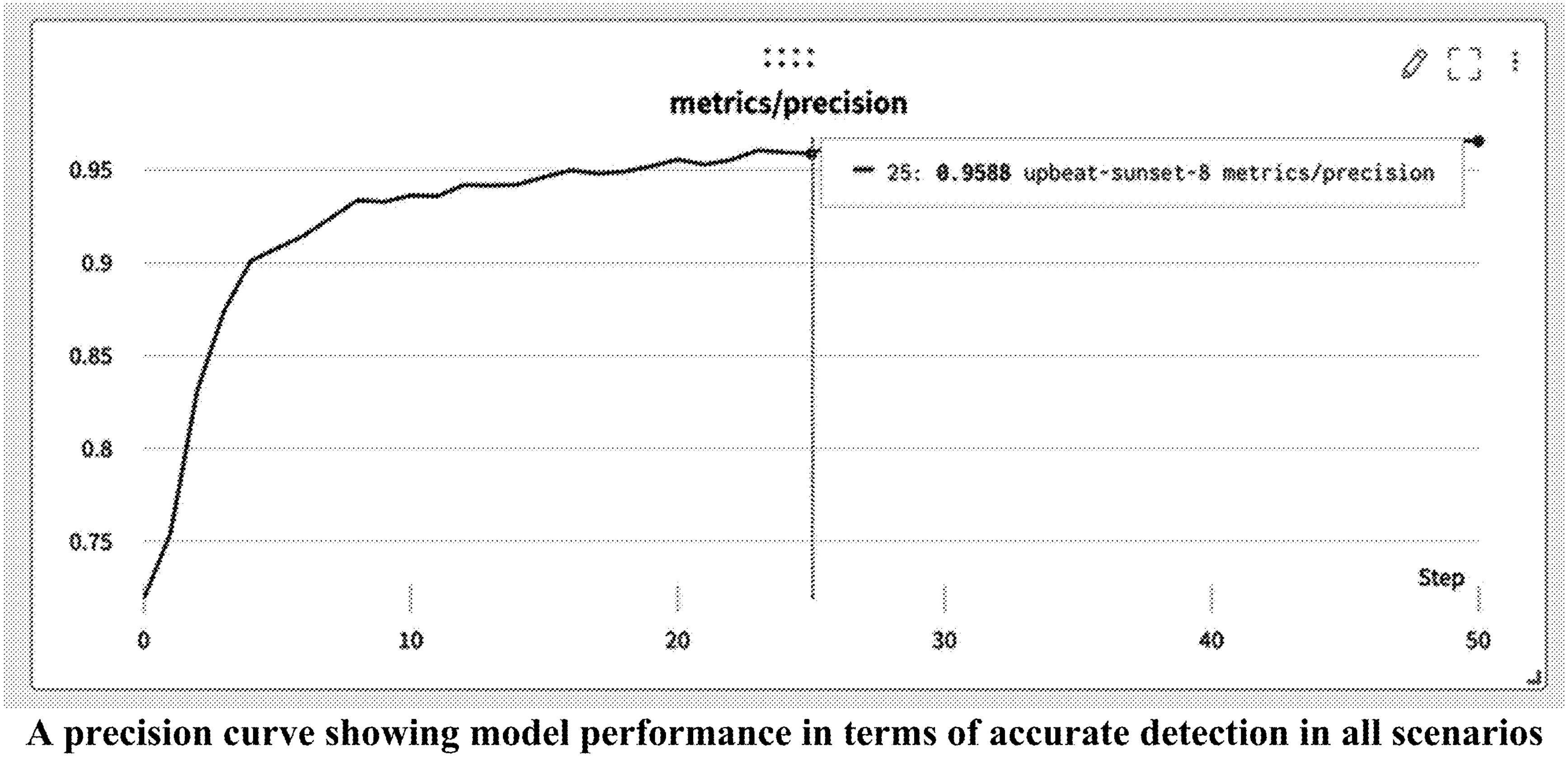
FIG. 26 shows precision curve showing model performance in terms of accurate detection in all scenarios.

FIG. 26 shows precision curve showing model performance in terms of accurate detection in all scenarios.

Visible and Full Body Bbox Creation

Figure 27:
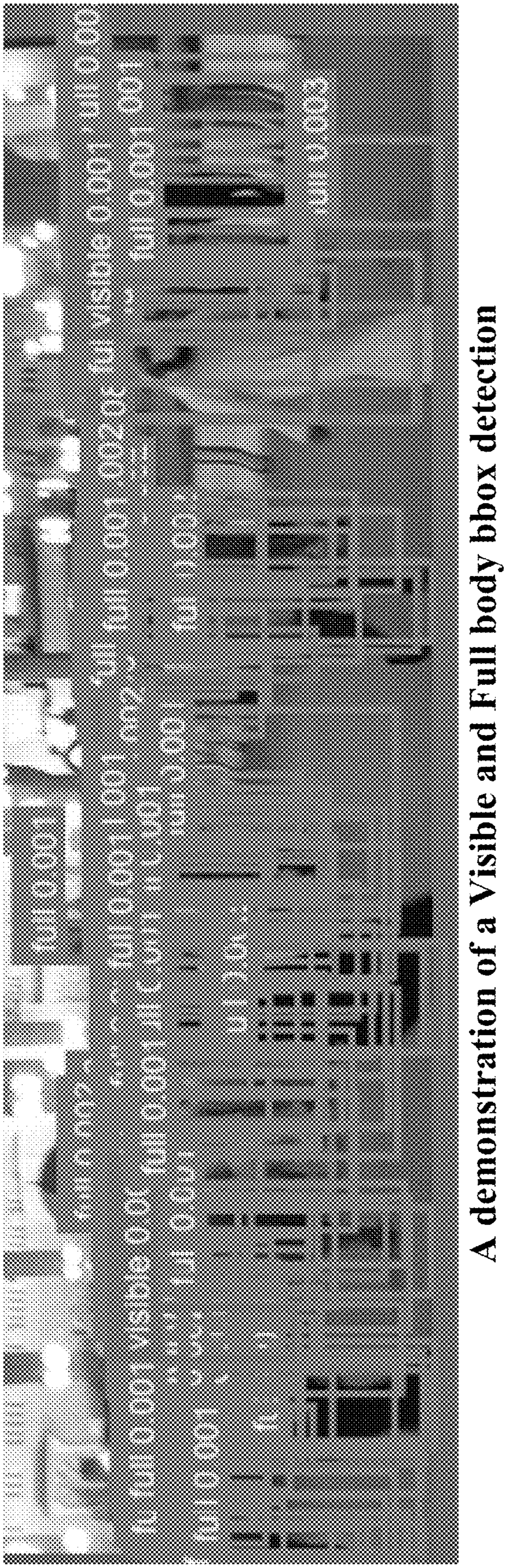
FIG. 27 shows a Visible and Full body bbox detection performance.

FIG. 27 shows a Visible and Full body bbox detection performance.

Figure 28:
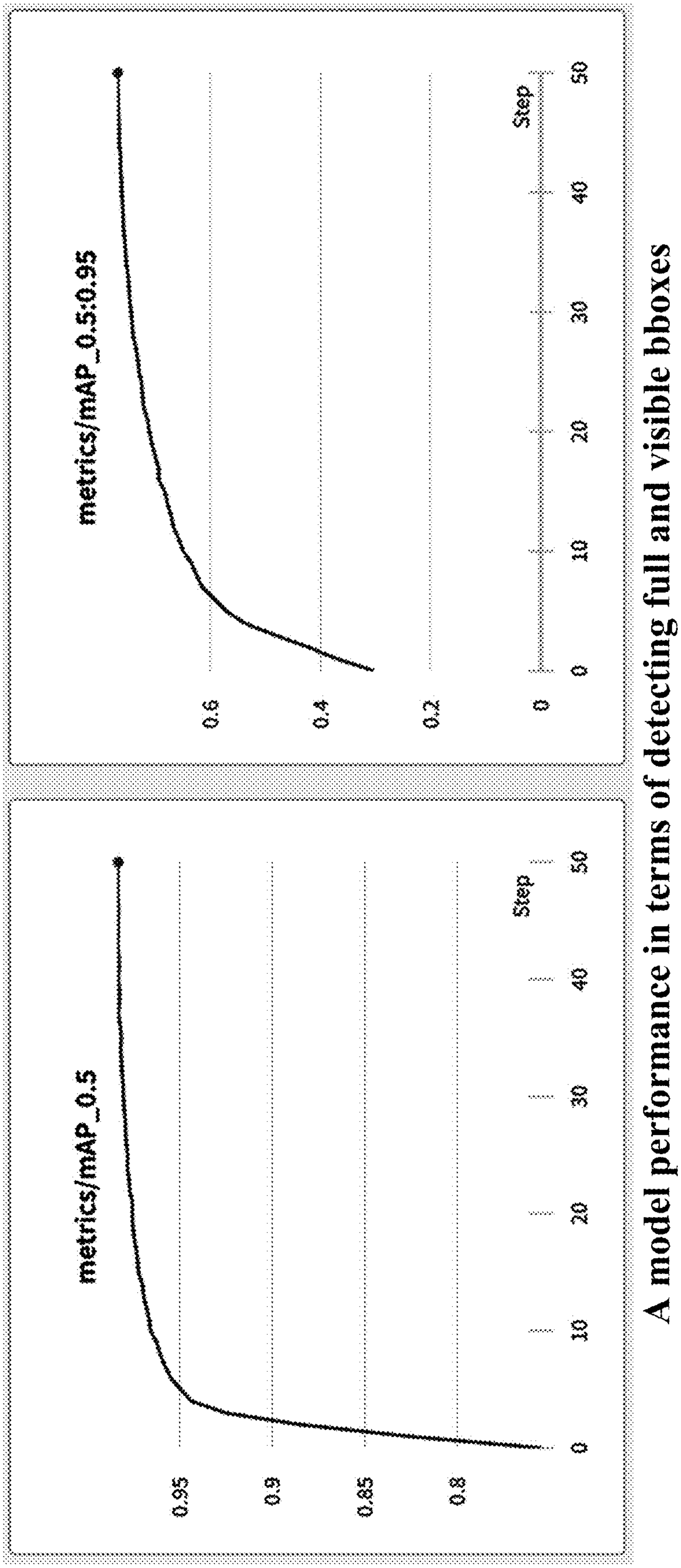
FIG. 28 shows model performance in terms of detecting full and visible bboxes.

FIG. 28 shows model performance in terms of detecting full and visible binding boxes.

Figure 29:
FIG. 29 shows a few screenshots of a deployed system in use.

FIG. 29 shows a few screenshots of a deployed system in use. The lower portion of FIG. 29 shows an integrated output of people tracking and counting.

Figure 30:
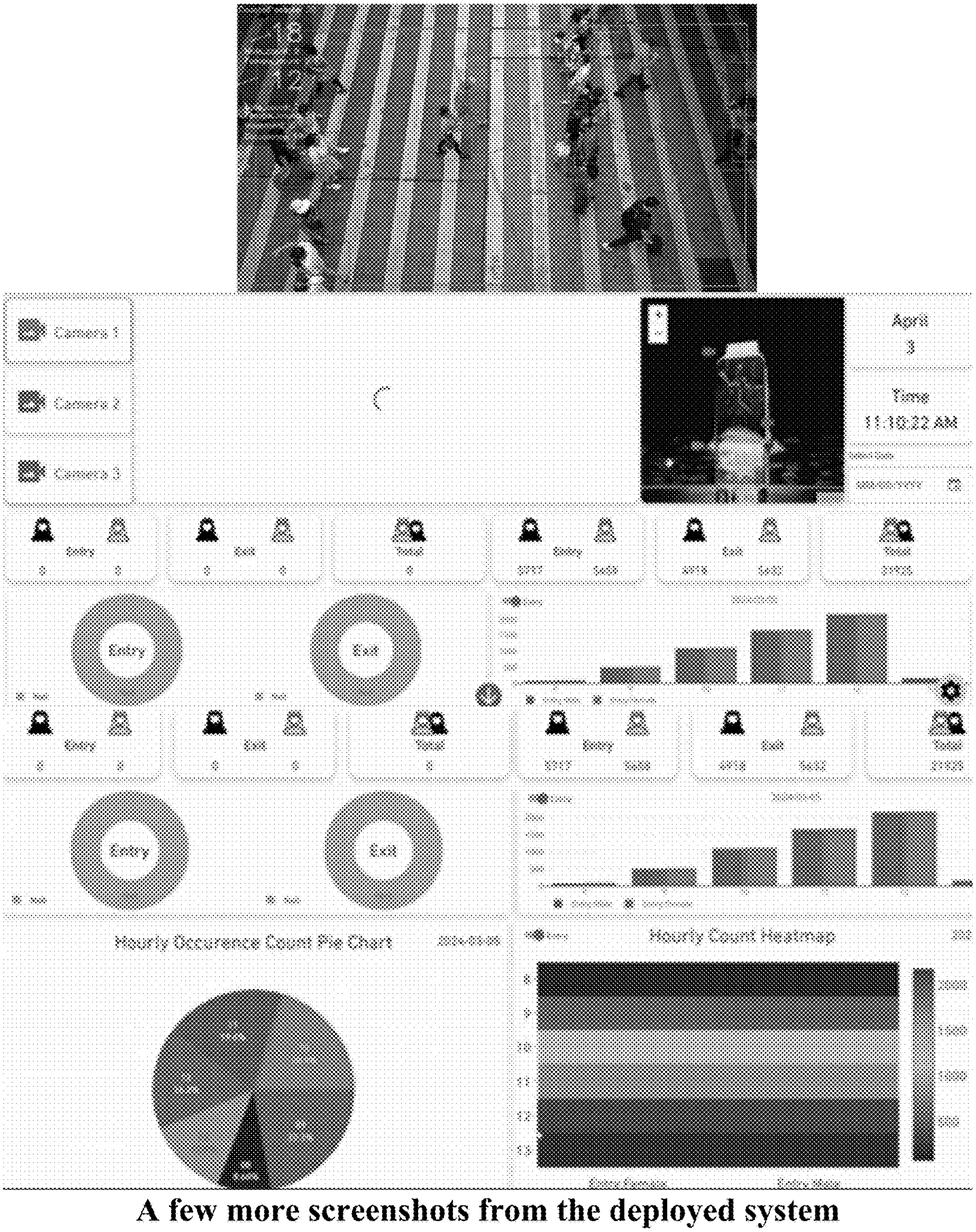
FIG. 30 shows a few more screenshots of a deployed system in use.

FIG. 30 shows a few more screenshots of a deployed system in use. The lower portion of FIG. 30 shows an integrated output of people tracking and counting.

Additional Embodiment Details

The present invention may be a system, a method, and/or a computer program product. The computer program product and the system may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device or a computer cloud via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, Java, Python or the like, and conventional procedural programming languages, such as the "C" programming language or similar programming languages, and scripting programming languages, such as Perl, JavaScript, or the like. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additional Notes

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Certain embodiments of this invention are described herein, including the best mode known to the inventors for carrying out the invention. It should be understood that the illustrated embodiments are exemplary only, and should not be taken as limiting the scope of the invention.

Benefits, other advantages, and solutions to problems have been described herein with regard to specific embodiments. However, the benefits, advantages, solutions to problems, and element(s) that may cause benefit, advantage, or solution to occur or become more pronounced are not to be construed as critical, required, or essential features or elements of the claims. Reference to an element in the singular is not intended to mean "one and only one" unless explicitly so stated, but rather "one or more." As used herein, the terms "comprise", "comprising", or a variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for practice unless expressly described as "essential" or "critical". Moreover, those skilled in the art will recognize that changes and modifications may be made to the exemplary embodiments without departing from the scope of the present invention. Thus, different embodiments may include different combinations, arrangements and/or orders of elements or processing steps described herein, or as shown in the drawing figures. For example, the various components, elements or process steps may be configured in alternate ways depending upon the particular application or in consideration of cost. These and other changes or modifications are intended to be included within the scope of the present invention, as set forth in the following claims.

What is claimed is:

1. A computer-implemented method for crowd analysis, comprising:

training an artificial intelligence (AI) model based on a pre-collected dataset of human images in which each human image is annotated for its body and face to enable the AI model to detect humans based on body or face appearance thereof;

deploying the AI model into a production environment, wherein the production environment comprises a computing system, and at least one photographing devices;

receiving a video sequence of a crowd from a photographing device;

preprocessing the video sequence, wherein the preprocessing the video sequence includes extracting a plurality of frames from the video sequence, removing noise from the video sequence, and subtracting background information from the video sequence;

detecting, for each frame of the plurality of frames, a plurality of persons, and, for each person of the plurality of persons, extracting a plurality of global and local special features of the person that can be used for tracking the person in the video sequence, identifying the person based on the plurality of global and local features of the person including body features, clothing features, or facial features;

re-identifying, for each frame of the plurality of frames, the plurality of persons detected from each frame by monitoring whether there is re-appearance, for each person of the plurality of persons, across a plurality of a pre-determined number of frames of the plurality of frames, wherein the re-identifying maintains a same identification for a person of the plurality persons across the person's all appearances across the plurality of the pre-determined number of frames;

counting persons from the video sequence of the crowd to produce a counting report;

classifying persons from the video sequence of the crowd to produce a classifying report;

outputting the counting report and the classifying report;

wherein the training an artificial intelligence (AI) model step further comprises:

modifying a Yolov7 model pretrained on an image-set of crowd human to obtain a set of hyperparameters used for the Yolov7 model to achieve a better detection accuracy, wherein the image-set of crowd human has one or more annotation labels for each image therein;

analyzing the labeling annotation strategy of the image-set of crowd human and then parsing through all images in the image-set of crowd human to determine any inconsistency of the one or more annotation labels for each image in the image-set of crowd human, correcting all the inconsistent labels in the image-set of crowd human;

retraining the Yolov7 model with the image-set of crowd human to produce a new version of the Yolov7 model, investigating if the new version of the Yolov7 model would produce a same set result as the previous version of the Yolov7 model in running against a same set of test data, and updating the previous version of the Yolov7 model with the new version of the Yolov7 model in the case of that the new version of the Yolov7 model outperforms the previous version of the Yolov7 model;

retraining the new version of the Yolov7 model with only an image-set of human body to make the new version of the Yolov7 model detect humans from images based on imagery of human bodies only as opposed to imagery of human bodies and human faces;

integrating the new version of the Yolov7 model in a semi-production environment, and generating a batch of labeled images by running the new version of the Yolov7 model on a semi-production dataset;

correcting any labeling mistakes in the batch of labeled images according to a set of pre-determined labeling strategies;

converting annotations on all images in the batch of labelled images according to the format of the image-set of crowd human;

evaluating the performance of all versions of the Yolov7 models running on the batch of labeled images in terms of accuracy of detection, and determining the performance trend across all previously versions of the Yolov7 models;

retraining the latest version of the Yolov7 model with a new batch of data that is different from any batch of data previously used;

repeating the steps from 5 to 9, until reaching a pre-determined threshold of detection accuracy; and outputting the latest version of the Yolov7 model as the AI model.

2. The computer-implemented method of claim 1, wherein counting persons is based on gender features of the plurality of persons detected for each frame of the plurality of frames, and classifying persons is based on gender features of the plurality of persons detected from each frame of the plurality of frames.

3. The computer-implemented method of claim 1, wherein the outputting the counting report and classifying report comprises displaying the counting report and classifying report.

4. The computer-implemented method of claim 1, wherein the outputting the counting report and classifying report comprises analyzing the counting report and classifying report for the purpose of meeting one or more institutional needs.

5. The computer-implemented method of claim 1, further comprises:

receiving a second video sequence of the crowd from a second photographing device, wherein the second photographing device is non-overlapping disjoint with the photographing device;

preprocessing the second video sequence, wherein the preprocessing the second video sequence includes extracting a plurality of frames from the second video sequence, removing noise from the second video sequence, and subtracting background information from the second video sequence;

detecting, for each frame of the plurality of frames extracted from the second video sequence, a plurality of persons, and, for each person of the plurality of persons, extracting a plurality of global and local features of the person that can be used for tracking the person in the second video sequence, identifying the person based on the plurality of global and local features of the person;

re-identifying, for each frame of the plurality of frames extracted from the video sequence and the second video sequence, the plurality of persons detected from each frame of the plurality of frames extracted from the video sequence and each frame of the plurality of frames extracted from the second video sequence by monitoring whether there is re-appearance, for each person of the plurality of persons, across a plurality of a second pre-determined number of frames of the plurality of frames extracted from the video sequence and the second video sequence, wherein the re-identifying maintains a same identification for a person of the plurality persons across the person's all appearances across the plurality of the pre-determined number of frames among the plurality of frames extracted from the video sequence and the second video sequence.

6. The computer-implemented method of claim 1, wherein the re-identifying step further comprises using a deep learning algorithm to detect whether two persons detected from two frames are the same person, wherein the deep learning algorithm is pretrained to attain a loss function that makes a distance between two images each of which is of a same person as small as possible and the distance between two images each of which is of a different person as large as possible.

7. The computer-implemented method of claim 1, wherein the training an artificial intelligence (AI) model is conducted based on a locally collected image-set containing images of local Arab people's clothing custom in which females wear Abaya and males wear Shimaagh.

8. The computer-implemented method of claim 1, further comprises benchmarking the performance of detecting people, counting detected people and classifying detected people, and retraining the AI model in an interactive way, in the case of that the benchmarking produces an unsatisfactory result, based on a plurality of custom dataset until the benchmarking produces a satisfactory result.

9. The computer-implemented method of claim 1, wherein the classifying step uses a file and folder directory structure in the production environment to facilitate the classifying step.

10. A system, comprising:

a computing device, one or more photographing devices, wherein the computing device comprises a GPU, a processor, one or more computer-readable memories and one or more computer-readable, tangible storage devices, one or more input devices, one or more output devices, and one or more communication devices, and wherein the one or more photographing devices are connected to the computing device for feeding one or more captured video streams of human crowd scenes to the computing device's video buffer, and the computing device, prior to receiving the one or more captured video streams of human crowd scenes from the one or more photographing devices, to perform operations of training an artificial intelligence (AI) model based on a pre-collected dataset of human images in which each human image is annotated for its body and face to enable the AI model to detect humans based on body or face appearance thereof; and deploying the AI model into a production environment, wherein the production environment comprises a computing system, and at least one photographing devices, and wherein the computing device, upon receiving a video sequence of a crowd from one of the one or more photographing devices, to perform operations comprising:

preprocessing the video sequence, wherein the preprocessing the video sequence includes extracting a plurality of frames from the video sequence, removing noise from the video sequence, and subtracting background information from the video sequence;

detecting, for each frame of the plurality of frames, a plurality of persons, and, for each person of the plurality of persons, extracting a plurality of global and local special features of the person that can be used for tracking the person in the video sequence, identifying the person based on the plurality of global and local features of the person including body features, clothing features, or facial features;

re-identifying, for each frame of the plurality of frames, the plurality of persons detected from each frame by monitoring whether there is re-appearance, for each person of the plurality of persons, across a plurality of a pre-determined number of frames of the plurality of frames, wherein the re-identifying maintains a same identification for a person of the plurality persons across the person's all appearances across the plurality of the pre-determined number of frames;

counting persons from the video sequence of the crowd to produce a counting report;

classifying persons from the video sequence of the crowd to produce a classifying report;

outputting the counting report and the classifying report;

wherein the training the artificial intelligence (AI) model step further comprises:

modifying a Yolov7 model pretrained on an image-set of crowd human to obtain a set of hyperparameters used for the Yolov7 model to achieve a better detection accuracy, wherein the image-set of crowd human has one or more annotation labels for each image therein;

analyzing the labeling annotation strategy of the image-set of crowd human and then parsing through all images in the image-set of crowd human to determine any inconsistency of the one or more annotation labels for each image in the image-set of crowd human, correcting all the inconsistent labels in the image-set of crowd human;

retraining the Yolov7 model with the image-set of crowd human to produce a new version of the Yolov7 model, investigating if the new version of the Yolov7 model would produce a same set result as the previous version of the Yolov7 model in running against a same set of test data, and updating the previous version of the Yolov7 model with the new version of the Yolov7 model in the case of that the new version of the Yolov7 model outperforms the previous version of the Yolov7 model;

retraining the new version of the Yolov7 model with only an image-set of human body to make the new version of the Yolov7 model detect humans from images based on imagery of human bodies only as opposed to imagery of human bodies and human faces;

integrating the new version of the Yolov7 model in a semi-production environment, and generating a batch of labeled images by running the new version of the Yolov7 model on a semi-production dataset;

correcting any labeling mistakes in the batch of labeled images according to a set of pre-determined labeling strategies;

converting annotations on all images in the batch of labelled images according to the format of the image-set of crowd human;

evaluating the performance of all versions of the Yolov7 models running on the batch of labeled images in terms of accuracy of detection, and determining the performance trend across all previously versions of the Yolov7 models;

retraining the latest version of the Yolov7 model with a new batch of data that is different from any batch of data previously used;

repeating the steps from 5 to 9, until reaching a pre-determined threshold of detection accuracy; and outputting the latest version of the Yolov7 model as the AI model.

11. The system of claim 10, wherein counting persons is based on gender features of the plurality of persons detected for each frame of the plurality of frames, and classifying persons is based on gender features of the plurality of persons detected from each frame of the plurality of frames.

12. The system of claim 10, wherein the outputting the counting report and classifying report comprises displaying the counting report and classifying report.

13. The system of claim 10, wherein the outputting the counting report and classifying report comprises analyzing the counting report and classifying report for the purpose of meeting one or more institutional needs.

14. The system of claim 10, the computing device to perform operations further comprising:

receiving a second video sequence of the crowd from a second photographing device, wherein the second photographing device is non-overlapping disjoint with the photographing device;

preprocessing the second video sequence, wherein the preprocessing the second video sequence includes extracting a plurality of frames from the second video sequence, removing noise from the second video sequence, and subtracting background information from the second video sequence;

detecting, for each frame of the plurality of frames extracted from the second video sequence, a plurality of persons, and, for each person of the plurality of persons, extracting a plurality of global and local features of the person that can be used for tracking the person in the second video sequence, identifying the person based on the plurality of global and local features of the person;

re-identifying, for each frame of the plurality of frames extracted from the video sequence and the second video sequence, the plurality of persons detected from each frame of the plurality of frames extracted from the video sequence and each frame of the plurality of frames extracted from the second video sequence by monitoring whether there is re-appearance, for each person of the plurality of persons, across a plurality of a second pre-determined number of frames of the plurality of frames extracted from the video sequence and the second video sequence, wherein the re-identifying maintains a same identification for a person of the plurality persons across the person's all appearances across the plurality of the pre-determined number of frames among the plurality of frames extracted from the video sequence and the second video sequence.

15. The system of claim 10, wherein the re-identifying step further comprises using a deep learning algorithm to detect whether two persons detected from two frames are the same person, wherein the deep learning algorithm is pre-trained to attain a loss function that makes a distance between two images each of which is of a same person as small as possible and the distance between two images each of which is of a different person as large as possible.

16. The system of claim 10, wherein the training an artificial intelligence (AI) model is conducted based on a locally collected image-set containing images of local Arab people's clothing custom in which females wear Abaya and males wear Shimaagh.

17. The system of claim 10, the computing device, prior to receiving the one or more captured video streams of human crowd scenes from the one or more photographing devices, to perform operations that further comprise benchmarking the performance of detecting people, counting detected people and classifying detected people, and retraining the AI model in an interactive way, in the case of that the benchmarking produces an unsatisfactory result, based on a plurality of custom dataset until the benchmarking produces a satisfactory result.

18. The system of claim 10, wherein the classifying step uses a file and folder directory structure in the production environment to facilitate the classifying step.

* * * * *